(12) United States Patent
Dailey et al.

(10) Patent No.: US 9,897,723 B2
(45) Date of Patent: Feb. 20, 2018

(54) STARSHADE WITH ATTRIBUTES FACILITATING ASSEMBLY

(71) Applicant: Northrop Grumman Systems Corporation, Falls Church, VA (US)

(72) Inventors: Dean R. Dailey, Torrance, CA (US); Nicholas B. Dailey, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 185 days.

(21) Appl. No.: 15/063,033

(22) Filed: Mar. 7, 2016

(65) Prior Publication Data

US 2017/0254929 A1    Sep. 7, 2017

(51) Int. Cl.
| | |
|---|---|
| *B64G 1/10* | (2006.01) |
| *G02B 5/00* | (2006.01) |
| *G02B 7/00* | (2006.01) |
| *G02B 23/00* | (2006.01) |
| *B64G 1/22* | (2006.01) |

(52) U.S. Cl.
CPC ............ *G02B 5/005* (2013.01); *B64G 1/105* (2013.01); *B64G 1/222* (2013.01); *G02B 7/00* (2013.01); *G02B 23/00* (2013.01); *B64G 1/10* (2013.01); *B64G 1/22* (2013.01); *B64G 2001/1057* (2013.01); *G02B 5/00* (2013.01)

(58) Field of Classification Search
CPC . G02B 5/00; G02B 5/005; G02B 7/00; G02B 23/00; B64G 1/10; B64G 1/105; B64G 1/22; B64G 1/222; B64G 2001/1057

USPC ............................................. 359/614; 29/428
See application file for complete search history.

(56) References Cited

U.S. PATENT DOCUMENTS 3,918,510 A * 11/1975 Hayward ................ B60P 3/343
                                                      135/119
4,171,013 A * 10/1979 Clark ..................... B60P 3/343
                                                      135/140

(Continued)

OTHER PUBLICATIONS

Postman, M. et al; Feasibility of Using Human Spaceflight or Robotic Missions for Servicing Existing and Future Spacecraft RRI# NNG10FC43-RFI; 25 pages; 2010.

(Continued)

*Primary Examiner* — William R Alexander
(74) *Attorney, Agent, or Firm* — Patti & Malvone Law Group, LLC

(57) ABSTRACT

An exemplary starshade comprises a tensegrity truss structure having a central hub with radially extending, telescoping booms. Telescoping tension struts connected to the central hub and booms provide a compressive force on the booms during final truss deployment. Opaque petals, not supported by the tensegrity truss structure prior to its final deployment, are each sequentially placed on and attached to the tensegrity truss structure in side by side position to form a concentric ring of petals spaced apart from the central hub. A fan fold covering, not supported by the tensegrity truss structure prior to its final deployment, is placed on and attached to the tensegrity truss structure to form an opaque, concentric inner ring about the central hub. An outer edge of the inner ring is adjacent an interior edge of the concentric ring of petals to block light from the petals to the central hub.

18 Claims, 34 Drawing Sheets

(56) References Cited

U.S. PATENT DOCUMENTS

| | | | | |
|---|---|---|---|---|
| 4,561,614 | A * | 12/1985 | Olikara | B64G 1/222 |
| | | | | 136/245 |
| 5,190,392 | A | 3/1993 | Parma et al. | |
| 5,407,152 | A | 4/1995 | Pelischek et al. | |
| 6,191,757 | B1 * | 2/2001 | Bassily | H01Q 1/288 |
| | | | | 343/912 |
| 6,199,988 | B1 * | 3/2001 | Krawczyk | B64G 1/361 |
| | | | | 343/840 |
| 6,290,275 | B1 | 9/2001 | Braam et al. | |
| 6,481,671 | B1 * | 11/2002 | Blair | B64G 1/50 |
| | | | | 244/164 |
| 6,647,668 | B1 * | 11/2003 | Cohee | B64G 1/222 |
| | | | | 52/1 |
| 7,557,995 | B1 * | 7/2009 | Lloyd | G02B 23/16 |
| | | | | 359/601 |
| 8,074,324 | B2 | 12/2011 | Warren et al. | |
| 8,480,241 | B1 | 7/2013 | Tenerelli et al. | |
| 9,396,294 | B1 * | 7/2016 | Lyon | G06F 17/5009 |
| 9,550,584 | B1 * | 1/2017 | Harvey | B64G 1/222 |
| 9,625,712 | B1 * | 4/2017 | Tenerelli | G02B 27/00 |
| 9,709,793 | B1 * | 7/2017 | Seltzer | G02B 23/20 |
| 2005/0028852 | A1 * | 2/2005 | Reese | A45B 23/00 |
| | | | | 135/20.1 |
| 2006/0076459 | A1 * | 4/2006 | Dailey | B64G 1/66 |
| | | | | 244/173.1 |
| 2008/0180802 | A1 * | 7/2008 | Cash | G02B 27/58 |
| | | | | 359/601 |
| 2011/0242663 | A1 * | 10/2011 | Daily | G02B 5/005 |
| | | | | 359/601 |

OTHER PUBLICATIONS

Hoyt, R. et al; SpiderFab: An Architecture for Self-Fabricating Space Systems; American Institute of Aeronautics and Astronautics; 2013; 5509; 17 pages.

Hoyt, R. et al; SpiderFab™: Process for On—Orbit Construction of Kilometer—Scale Apertures; Final Report of the NASA NNX12AR13G Contract; 2013; 53 pages.

Aziz, S.; Development and verification of ground-based tele-robotics operations concept for Dextre; Acta Astronautica 86; 2013; pp. 1-9; Elsevier Ltd.

Cameron, C. et al; Conceptual Design for a Space Based Solar Power System; Competition, Undergraduate Team Space Design; 2013; 99 Pages (See pp. 41-44); AIAA.

Dorsey; J. T. et al; An efficient and versatile means for assembling and manufacturing systems in space; In Proceedings of the AIAA Space Conference; pp. 1-19; 2012; AIAA 2012-5115.

* cited by examiner

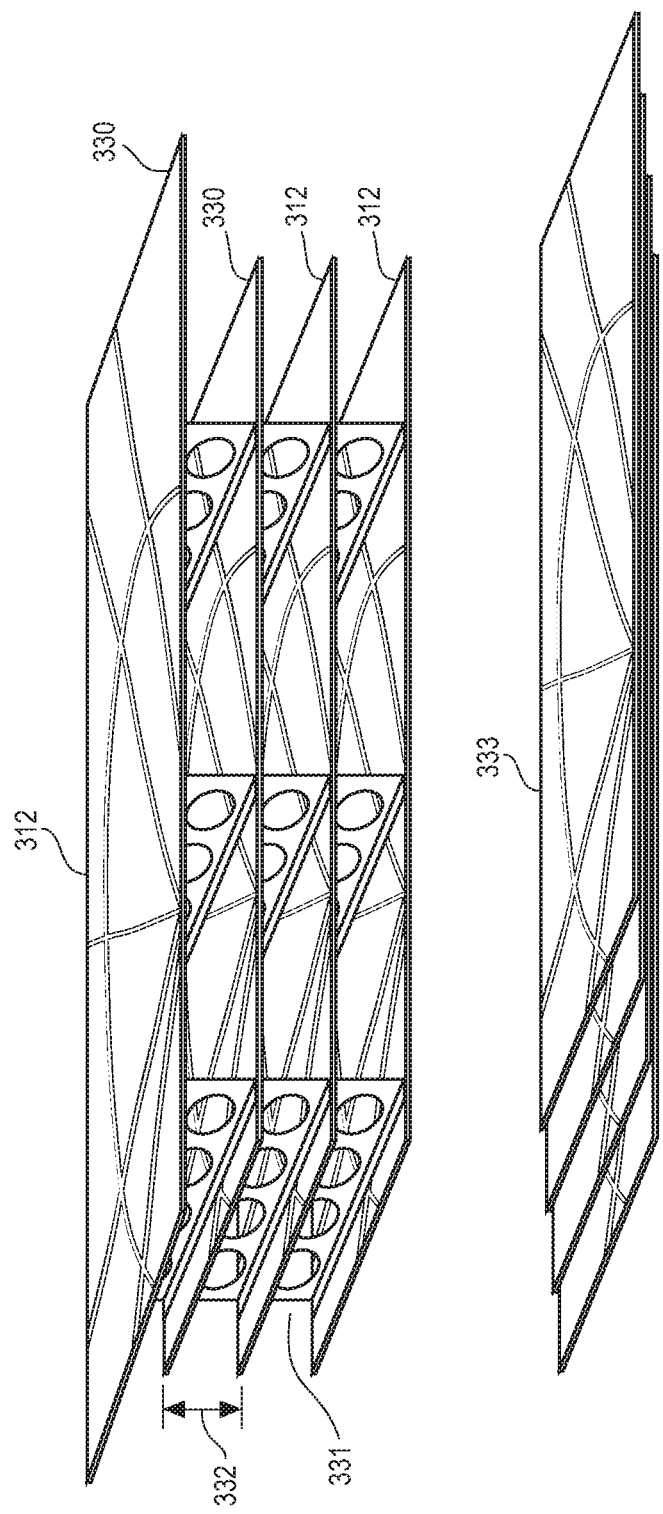

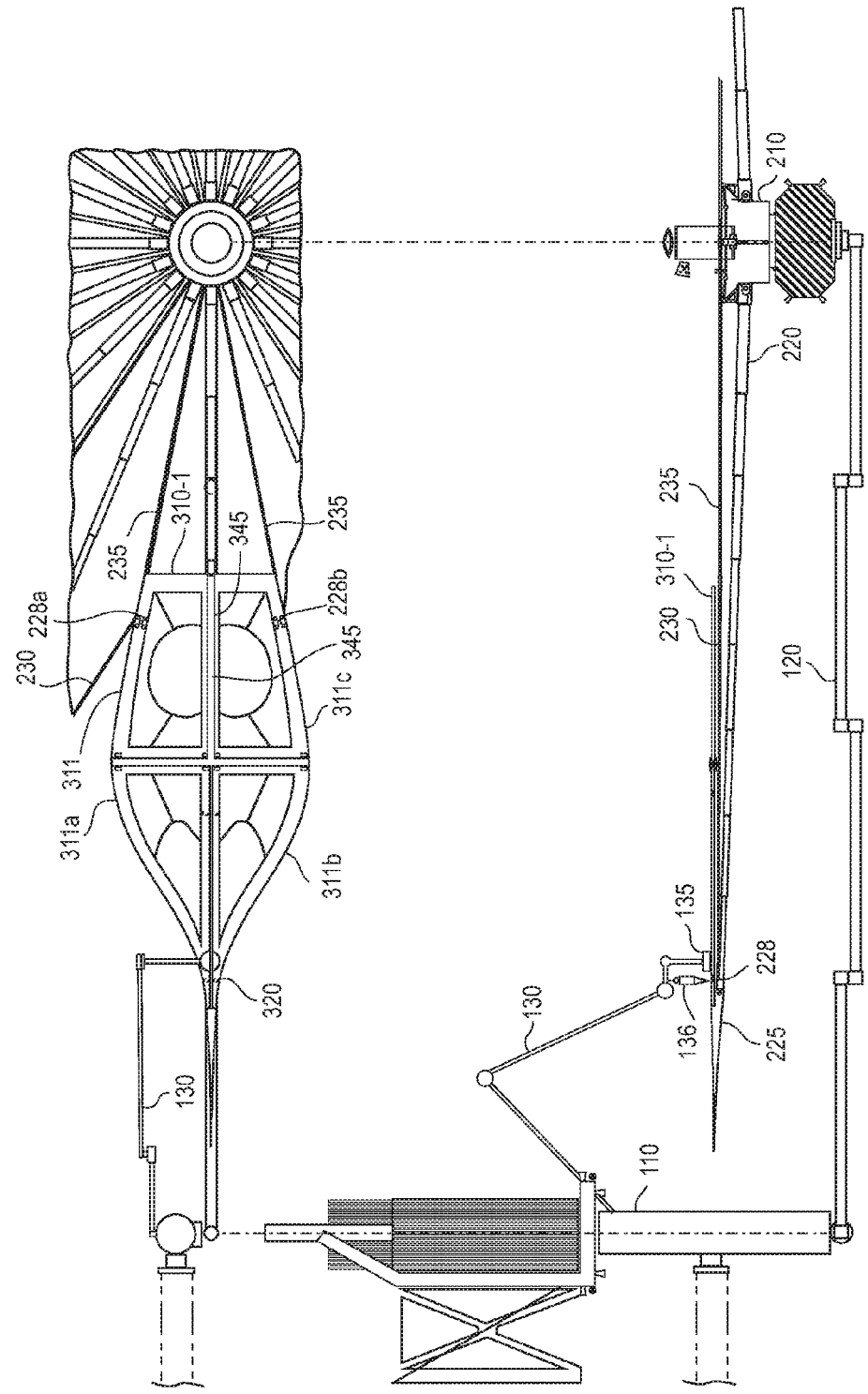

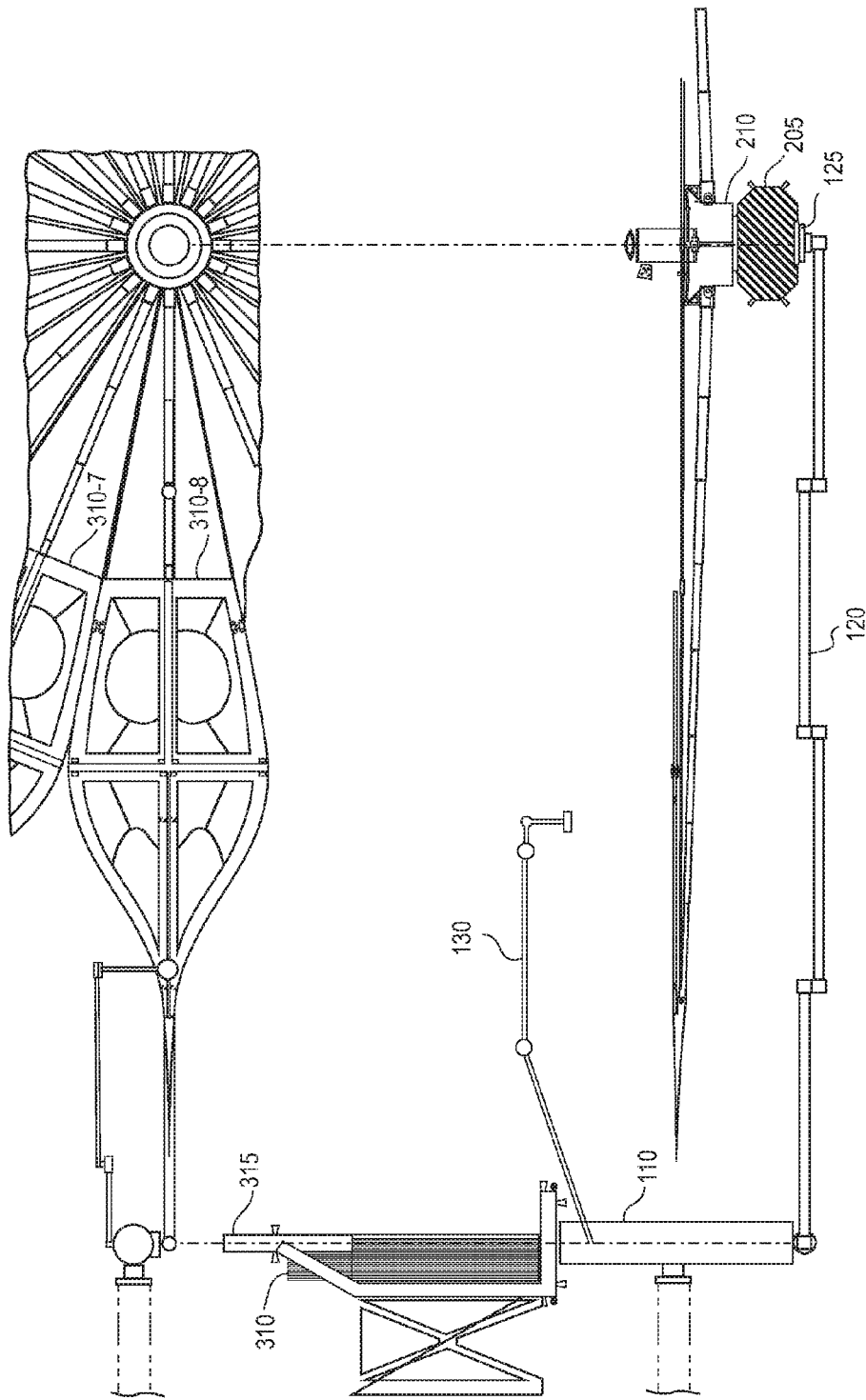

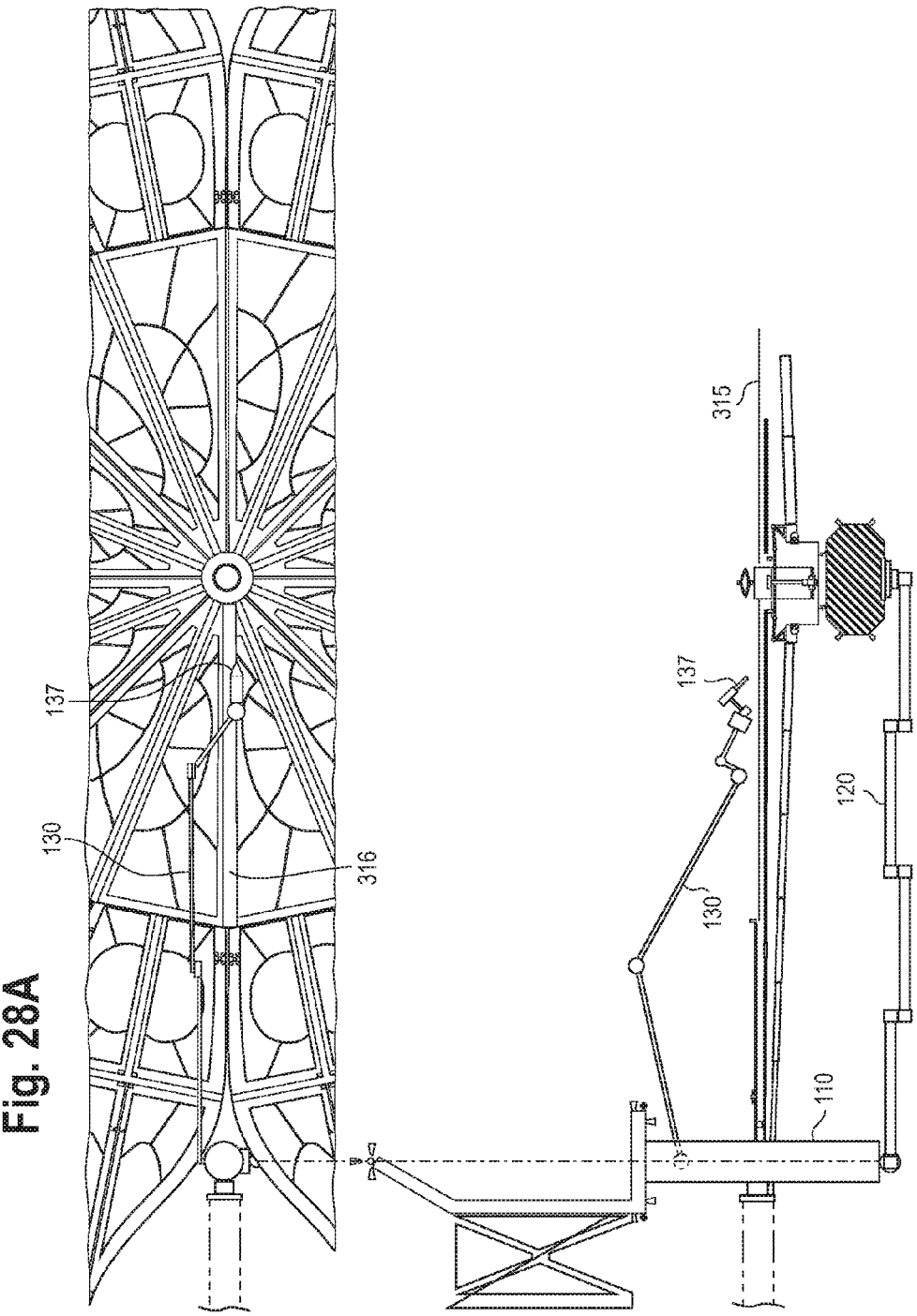

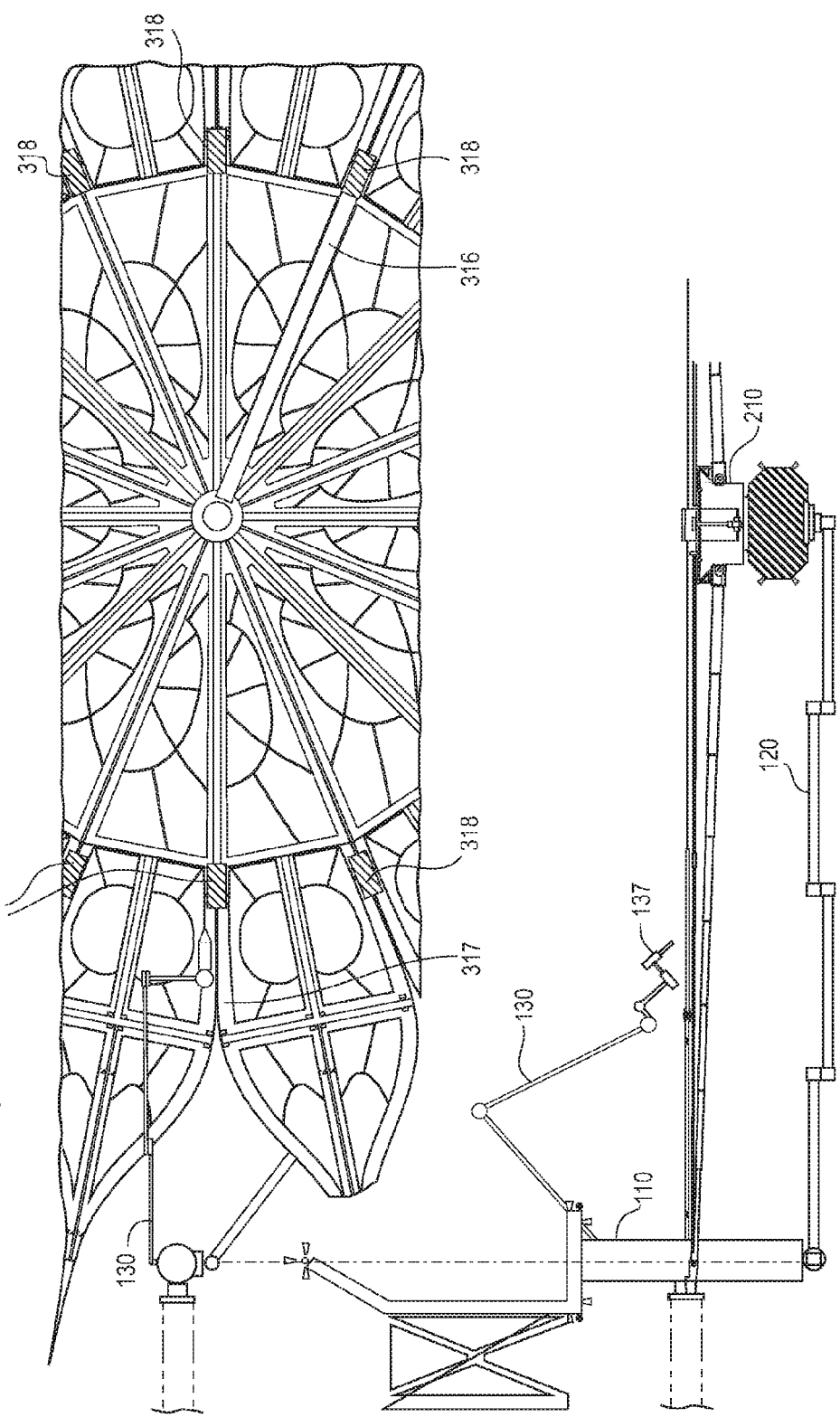

STARSHADE WITH ATTRIBUTES FACILITATING ASSEMBLY

BACKGROUND

This invention relates to visual observations in space and more specifically relates to a space deployable and assemblable starshade.

A starshade is a large space-based light shield which serves as an external occulting mask in an external stellar coronagraph system. Its function is to cast the shadow of a star on a telescope. Its optical element properties are derived primarily from the starlight diffraction cancelling shape around its perimeter, although it must also minimize other brightness noise sources such as stray sunlight. Contrary to typical optical elements such as reflecting optics whose optical properties are derived though very finely figured mirrored surface finish, which strongly effects optical wavefront error, the starshade surface has no optical wavefront impact. No light reflected directly off of the starshade's roughly planar surface is directed into the telescope nominally, meaning the roughly planar surface can be fairly rough (un-flat) and the external stellar coronagraph system's imaging capabilities are not affected.

The starshade and a corresponding space-based telescope are separated by a significant distance and together form a two-spacecraft observation system. The starshade is positioned precisely between the space-based telescope and a nearby star to block the direct light from the star before it reaches the telescope. The field of view of the telescope is centered on a nearby star and set just wide enough to observe exoplanets (or other objects) orbiting the star, while minimizing the view of bright objects not orbiting the star (such as background galaxies). The nearby star's shadow on the telescope (provided by the starshade) facilitates detection of the exoplanets/objects with much lower brightness than the central nearby star (in visible wavelength band light). This technique allows astronomers to directly observe and spectrally characterize the light reflected off of the exoplanets/objects, which can be as small as Earth sized and in the nearby star's habitable zone (the distance from the star required to have liquid water temperatures on the exoplanet's surface). Starlight reflected off the exoplanets/objects in the direction of the telescope is permitted to pass outside of and very close to the starshade without being shaded. The starshade system is also designed and used in a manner required to suppress sunlight which is either reflected off of or transmitted through the starshade and into the telescope. Sunlight suppression must be at least as efficient as the suppression of the nearby star, in the center of the field of view of the telescope; where a typical starlight suppression requirement of $10^{10}$ (or one part in ten billion permitted to enter the telescope) is required for the direct imaging technique described to be successful.

Flower-shaped petals of the starshade enhance the ability of the starshade to more effectively block the starlight by reducing the constructive bending of light waves from the star at the edges of the starshade, into the telescope. This enhances a darker shadow cast towards the telescope by the starshade. While a simple circular shaped starshade would be much simpler to construct, its shading capabilities would be many orders of magnitude worse than the flower shaped petals, due to diffraction at the hypothetically circular starshade edge, permitting constructive bending at the circular edge and re-imaging of the starlight within the telescope; peaking with a bright spot at the center (referred to as the Spot of Arago).

The "Space-Based Occulter" in U.S. Pat. No. 8,167,247, assigned to the assignee of the present invention, describes such a starshade. It is carried into space using a single launch, as a collapsed umbrella-like configuration in which a covering is attached to a folded mechanical structure so that to achieve the final deployed state in space the folded mechanical structure is unfolded into a final position causing the connected covering to expand accordingly. While the resulting deployed occulter satisfies the starlight blocking goal, it will be appreciated that going from the stored state during its passage into space to its final deployed state requires significant movement and interaction of its mechanical structure and interconnected petals and coverings.

SUMMARY

It is an object of the present invention to provide a starshade and associated method of deployment and assembly in space which can be more simply scale modeled, demonstrated and ultimately developed at full scale in a 1G gravity environment. By de-coupling the starshade covering deployment (flower shaped petals and inner blanket) from the primary structure deployment, and then creating a stage by stage assembly of the components in space, the development of each of the components is greatly simplified. It is considerably more challenging to model and demonstrate the previously described fully interconnected occulter in a 1G gravity environment due to the interactions and interrelationships of all of its components during deployment.

An additional object of the present invention is to show that a starshade design can facilitate the use of tele-robotically controlled appendages (control arms, motors, latches, installation tools) which may be operated either by astronauts onboard the space station where space based assembly is performed, or by operators working on the ground using downlinked telemetry data from the assembly module and starshade component spacecraft. An inherent benefit of space based assembly performed at a space station operated by astronauts is the redundant assembly backup that can be provided involving space-walk capability.

An additional object of the present invention is to show that starshades as large as the 62 meter exemplary embodiment can be delivered to space using more affordable commercial 5 meter EELV's which currently have lower lift capabilities than the largest military spec 5 meter EELV's. By de-coupling the starshade superstructure/spacecraft and petal shaped covering into separate launches, the possibility of launching using more affordable commercial 5 meter EELV's becomes realistic at the 62 meter starshade size. Launch cost for a commercial 5 meter EELV is significantly less than the cost to launch a military spec 5 meter EELV large enough to carry a fully interconnected 62 meter starshade and associated spacecraft to the orbit required. An additional object of the present invention is to show a starshade design which can be further increased in size beyond the limits imposed by single launch designs using the largest available 5 meter EELV's. Starshade size may be increased to larger than the 62 meter exemplary embodiment shown using more launches to increase starshade petal and covering area, and the assembly in space features shown in this invention.

An exemplary starshade comprises a tensegrity truss structure having a central hub with radially extending, telescoping booms. Telescoping struts connected to the central hub and booms provide a compressive force on the booms during final deployment, resulting in a tension load within the struts. Opaque petals, not supported by the tensegrity truss structure prior to its final deployment, are each sequentially placed on and attached to the tensegrity truss structure in side by side position to form a concentric ring of petals spaced apart from the central hub. A fan fold covering, not supported by the tensegrity truss structure to its final deployment, is placed on and attached to the tensegrity truss structure to form an opaque, concentric inner ring about the central hub. An outer edge of the inner ring is adjacent and overlapping an interior edge of the concentric ring of petals to block light from the petals to the central hub.

In an exemplary method for assembling a starshade, a tensegrity truss structure is deployed from a stored position to a final operational position. The tensegrity truss structure has booms each with an end mounted to a central hub with the booms being parallel to each other in the stored position. The booms are pivoted almost 90° radially outward and telescope in length to lie substantially in a nearly flat symmetrical conical frustum in the final operational position, where the frustum (cone) angle is the same as the pivot angle which is slightly less than 90°. A compressive force is exerted on the booms towards the central hub when the booms are in the final operational position by telescoping struts, connected to the central hub and booms, which lie substantially flat when deployed. A plurality of opaque petals are stored not supported by the tensegrity truss structure in its stored position. Each petal is sequentially placed and attached on the tensegrity truss structure in side by side position to form a concentric ring of petals spaced apart from the central hub while the tensegrity truss structure is in its final operational position. A fan fold covering is stored not supported by the tensegrity truss structure in its stored position. The fan fold covering is placed and attached to the tensegrity truss structure to form an opaque, concentric inner ring about the central hub while the tensegrity truss structure is in its final operational position. An outer edge of the inner ring is adjacent and overlaps an interior edge of the concentric ring of petals to block light from the petals to the central hub.

DESCRIPTION OF THE DRAWINGS

Features of exemplary implementations of the invention will become apparent from the description, the claims, and the accompanying drawings in which:

FIGS. 17-20, 20A & 21 illustrate a series of deployment steps for a petal.

FIG. 22 illustrates the deployment of the first 8 petals.

FIG. 28, 28A & 28B illustrate sealing some of the fan fold seams.

FIG. 29 illustrates the installation of valley gap flaps between adjacent petals.

DETAILED DESCRIPTION

Figure 1:
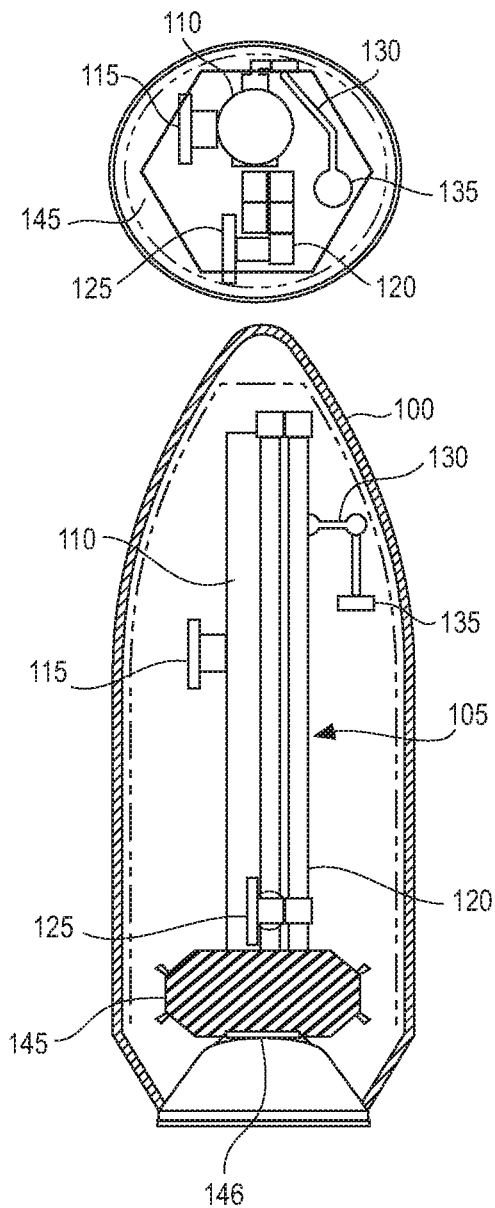
FIG. 1 illustrates an exemplary embodiment of a stored assembly module.

One aspect of the present invention resides in the recognition of the difficulties associated with modeling, developing and demonstrating occulters/starshades larger than 40 meters, in a 1G gravity environment, that are to be transported into space in a fully assembled but stored configuration. One reason for the difficulty in modeling/testing in a 1G gravity environment of such a starshade is the significant interactions and interrelationships of all the components. Another reason for the difficulties has to do with the large compaction ratio (deployed diameter/stored diameter) required of starshades larger than 40 meters that are designed to store and launch in the largest affordable launch vehicles (5 m EELV's). The larger the compaction ratio, the more complex and miniaturized the starshade deployment mechanisms need to be in order to fit all of the components into the launch fairing; a difficulty which is compounded when all of the starshade components are interconnected. Because starshades are designed for use in space and the weight of its components must be minimized, its components do not have sufficient strength in a 1G environment to maintain a fully deployed position without additional deployment bracing and supports. Even sub-scale models have the same challenge. Because of the interrelationships and relative movements of the components of a stored, substantially fully assembled occulter during deployment, it is very challenging to provide suitable deployment bracing and supports required for all of the interconnected components in a 1G environment that do not inhibit the required movements during deployment testing.

It is desirable to be able to test and demonstrate the deployment of a sub-scale model and/or full scale version of a starshade in a 1G environment in view of the desire to identify and remedy problems to minimize the likelihood of encountering such problems during an in-space deployment. Development may use sub-scale designs at increments such as 1/10, 1/4 and 1/2 scale to prove out component designs before producing the full scale article. For starshades larger than 40 meters, having compaction ratios greater than 10/1 in diameter for launch storage, all of the interconnected deployment components are already fairly miniaturized and complex at full scale; sub-scale development requirements worsen the miniaturization/complexity situation. The embodiment of this invention, in which certain components are sequentially assembled together, can be more easily modeled, developed and demonstrated in a 1G environment. The de-coupled deployments involving telescoping booms and struts can be offloaded and supported during deployment in 1G without the complexity of the covering system attached, and viceversa the de-coupled deployments involving the separate "Flat-Pack" style folded covering petals and fan fold center may be supported during deployment with traditional ground support systems since their deployments can be dealt with at the component level without the full interconnected 16 petal and tensegrity truss to deal with.

In accordance with the exemplary embodiment of the starshade and its deployment, the starshade is to be constructed in space from separately stored materials. In one example, three separate payloads may be concurrently or sequentially launched into space. For example, each payload may be sequentially launched into space aboard a very economical Falcon 9 two-stage 5 meter EELV rocket. In one example, one of three payloads includes a starshade assembly module that does not form part of the finally deployed starshade, but is utilized in the construction and assembly of the starshade from the materials carried in two other payloads. A second payload contains a tensegrity truss system which forms the umbrella-like backbone/superstructure of the starshade. This payload also includes a navigation, communication and positioning module used to propel the assembled starshade to a final utilization position in spaced-apart relationship with a corresponding telescope or other visual sighting device. The third payload contains petals that are unfolded and mounted near the ends of the booms of the superstructure and a fan-folded opaque material that is disposed around the interior of the superstructure to block light and form a solid umbra cast by the assembled starshade.

The structural components that will be described herein are largely formed of carbon fiber reinforced polymer (CFRP) but may be formed of other suitable materials. Large areas of non-structural covering are provided by Kapton blankets which will be described in more detail later. Although the petals preferably have hypergaussian-shaped edges to minimize the constructive diffractive re-direction of light and thus maximize the umbra provided by the starshade, other types and configurations of petals could be utilized. The exemplary starshade superstructure includes 16 booms with telescoping sections that are stored contracted and parallel to a longitudinal axis. These booms are first pivoted radially away from a central base and then extended radially outward. The force to pivot the booms can be provided by a single common drive platform having 16 linkage hinges, each of which link to the individual boom hinges using 4-bar mechanism connections, resulting in each pivot hinge being locked at 88.5° rotation. After the booms have been pivoted the boom telescoping features can be deployed using force provided by individual STEM drive assemblies (one per boom set) such as described in U.S. Pat. No. 5,315,795. Rigidity of the deployed superstructure is at least partly due to taut telescoping tension struts, which interconnect the telescoping booms and central hub, and lie substantially in a flat plane. U.S. Pat. No. 8,167,247, which describes a space-based occulter and is assigned to the assignee of the present invention, is incorporated herein by reference.

FIG. 1 illustrates an exemplary embodiment of an assembly module payload 105 stored on a docking maneuvering spacecraft module 145, within an evolved expendable launch vehicle (EELV), e.g. a Falcon 9 payload fairing 100 that can store a payload having a maximum 4.5 meters in diameter. The assembly module 105 includes an anchor boom 110 that supports a docking ring 115 for docking with a space station or other space-based support system. Docking ring 115 connects to the space station mechanically and electrically, providing structural stability and electrical power & signal connection between the assembly module 105 and the space station. All appendages of the assembly module can be controlled tele-robotically either by astronauts aboard the space station or by ground operators working with downlinked telemetry data from the assembly module. A controllable and extendable robotic boom 120 is attached near one end of the anchor boom 110 and has a docking ring 125 for engaging and docking mechanically and electrically with the starshade superstructure module. Another controllable and extendable robotic boom 130 is attached near the other end of the anchor boom 110 and has a tool 135 mounted at its end for engaging and moving petals and fan-fold covering from a stored position into a final deployment position on the starshade superstructure.

Figure 2:
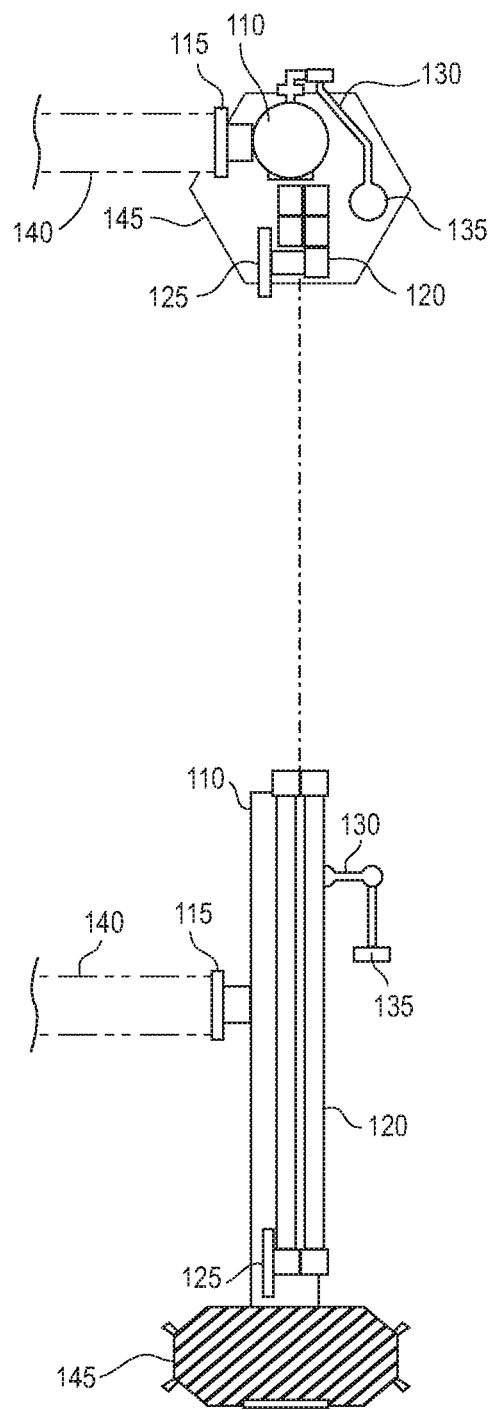
FIG. 2 illustrates the assembly module docked with a space station.

FIG. 2 illustrates the assembly module 105 docked, e.g. with a docking arm 140 of a space station. Spacecraft module 145 separates from the upper stage of booster at docking ring 146 (seen in FIG. 1) and uses a 6 degree of freedom (DOF) thruster configuration to maneuver and dock the assembly module 105 with the space station at docking ring 115. This figure and other figures showing the assembly module 105 assisting in various stages of deployment show both partial top and side views of the assembly module 105 as an aid to understanding each illustrated deployment step. Spacecraft module 145 is shown only in FIGS. 1 thru 4, and omitted for clarity from the remaining figures although the spacecraft module 145 would still be positioned as shown in FIGS. 1 thru 4.

Figure 3:
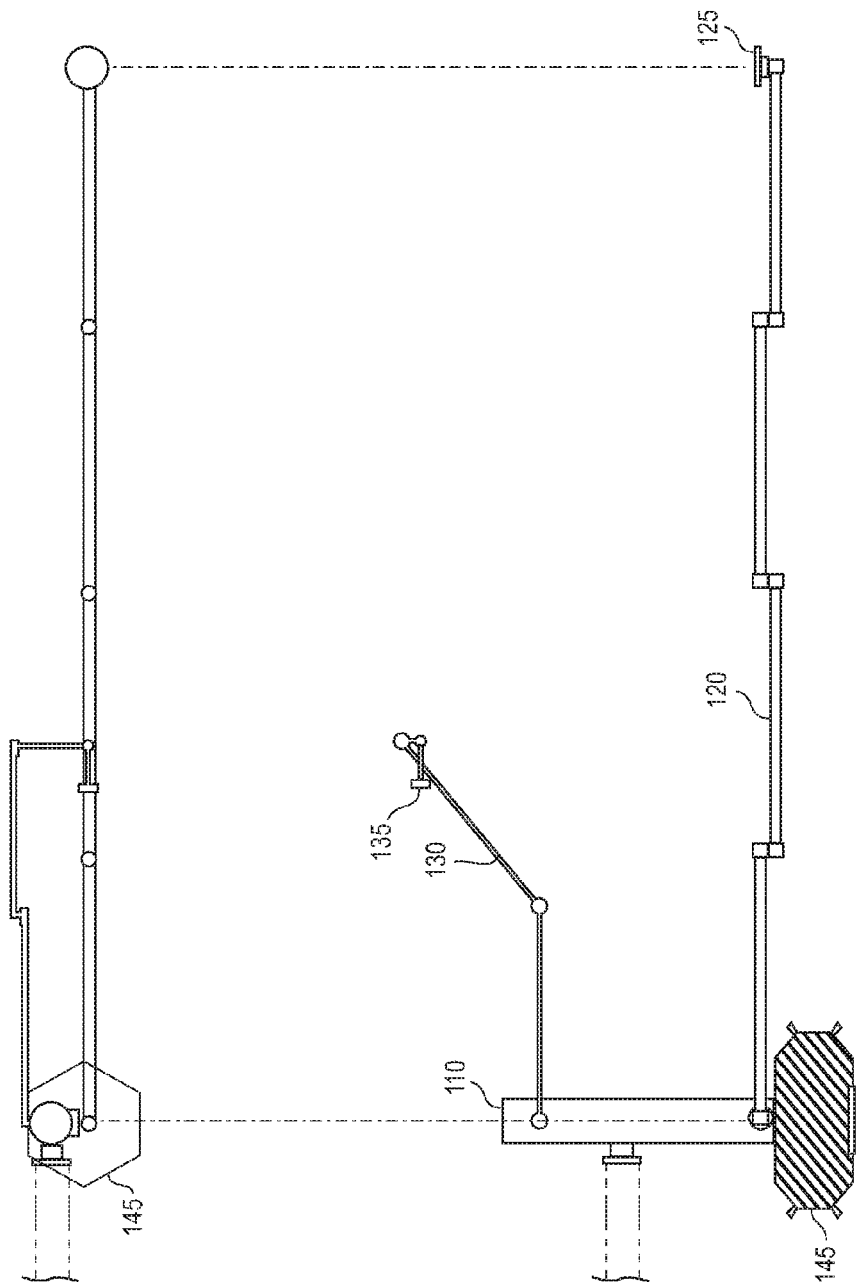
FIG. 3 illustrates the assembly module with its two booms extended.

FIG. 3 illustrates the assembly module 105 with the multiple segmented booms 120 and 130 extended. Preferably, each of the segments of the booms 120 and 130 are rotatably connected to each other by space qualified rotary actuators with cable wraps. Boom 120 is substantially fully extended away from the anchor boom 110 and the docking anchor 125 is disposed upward. This is in preparation for receiving and docking with the starshade superstructure module. The reference to "upward" and other directional terms as used herein are made in reference to the normal viewing orientation of the respective sheets of drawings.

Figure 4:
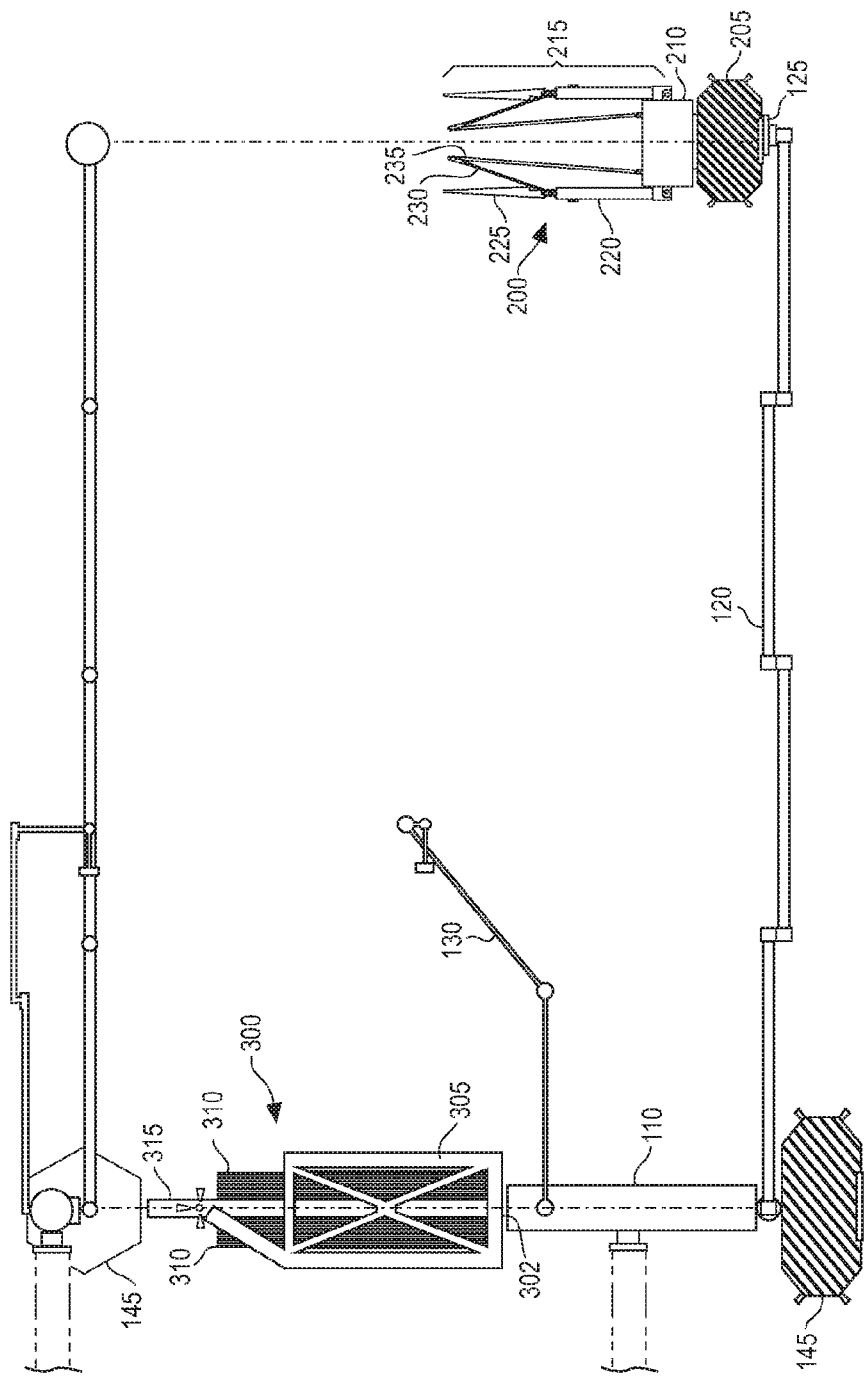
FIG. 4 illustrates the assembly module with one boom engaging the tensegrity truss module and the other boom ready to engage the starshade petal module attached to the body of the assembly module.

FIG. 4 illustrates the assembly module 105 with the docking attachment 125 of boom 120 engaging the tensegrity truss module 200 and the other boom 130 disposed for later engagement with the starshade petal module 300 now docked at ring 302 to an end of the anchor boom 110 of the assembly module 105. The tensegrity truss module 200, as will be described in more detail with regard to other figures, includes a propulsion module 205 that provides six DOF controlled maneuverability in space for module 200. A base module 210 mounted to the propulsion module 205 supports communications for the control of the propulsion module 205 and contains a drive mechanism enabling the extension and deployment of the superstructure boom assembly 215. The exemplary superstructure boom assembly 215 includes 16 telescoping booms 220 each with a distal tip assembly 225 and interconnected tension struts 230 and 235.

The starshade petal module 300, docked with an end of the anchor boom 110, includes a propulsion/caging module 305 that provides six DOF controlled maneuverability in space for the starshade petal module 300 and facilitates its docking with the anchor boom 110 at docking ring 115 mechanically and electrically. The exemplary starshade petal module 300 includes 16 stored petals 310, in two sets of 8, to be deployed respectively with the 16 extendable booms 220. It also includes a fan-fold assembly 315 that, when deployed, forms a circular covering about the interior of the starshade. The stored petals 310 and the fan fold 315 are caged structurally for launch using the propulsion/caging module 305.

Figure 5:
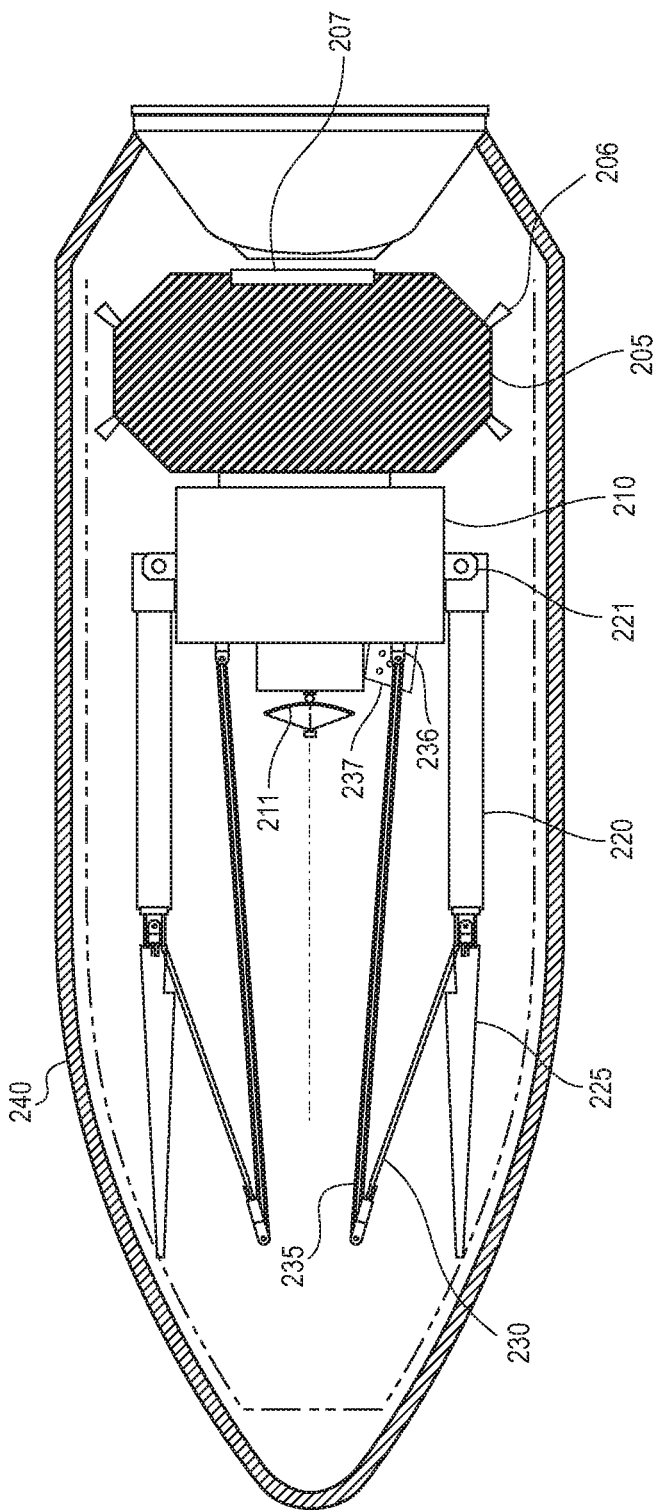
FIGS. 5-7 illustrate the stored tensegrity truss module.
Figure 6:
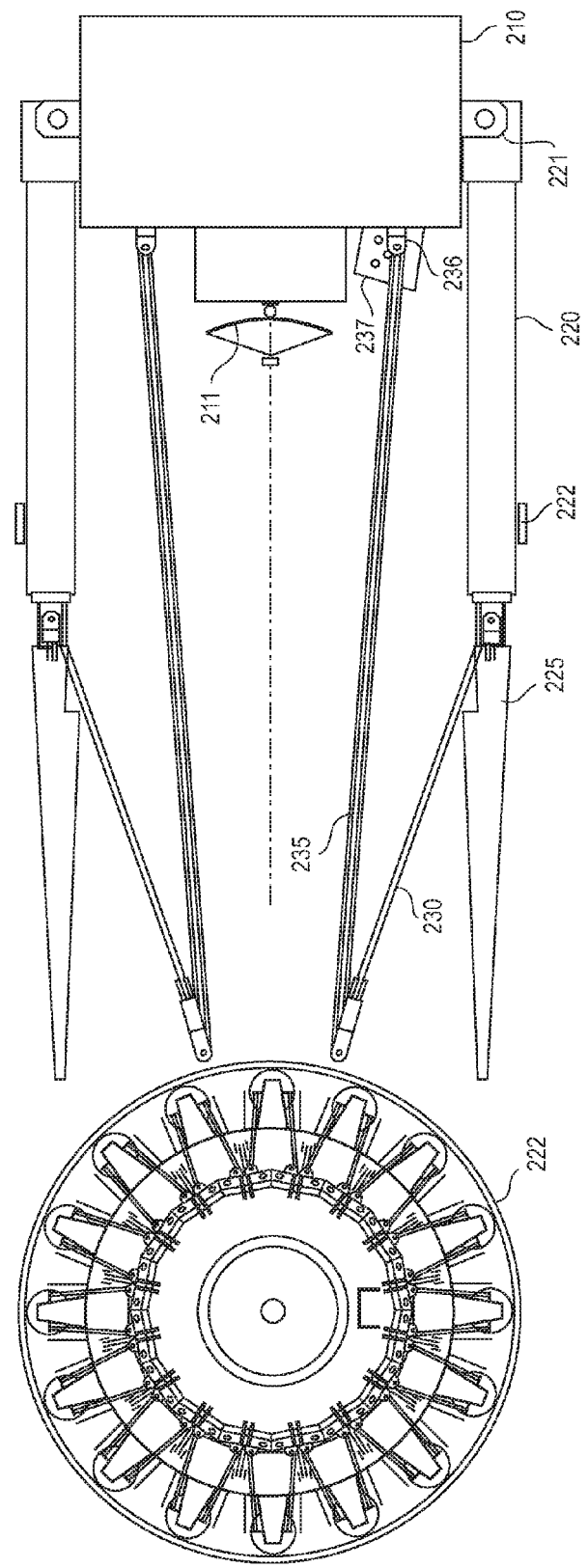
Figure 7:
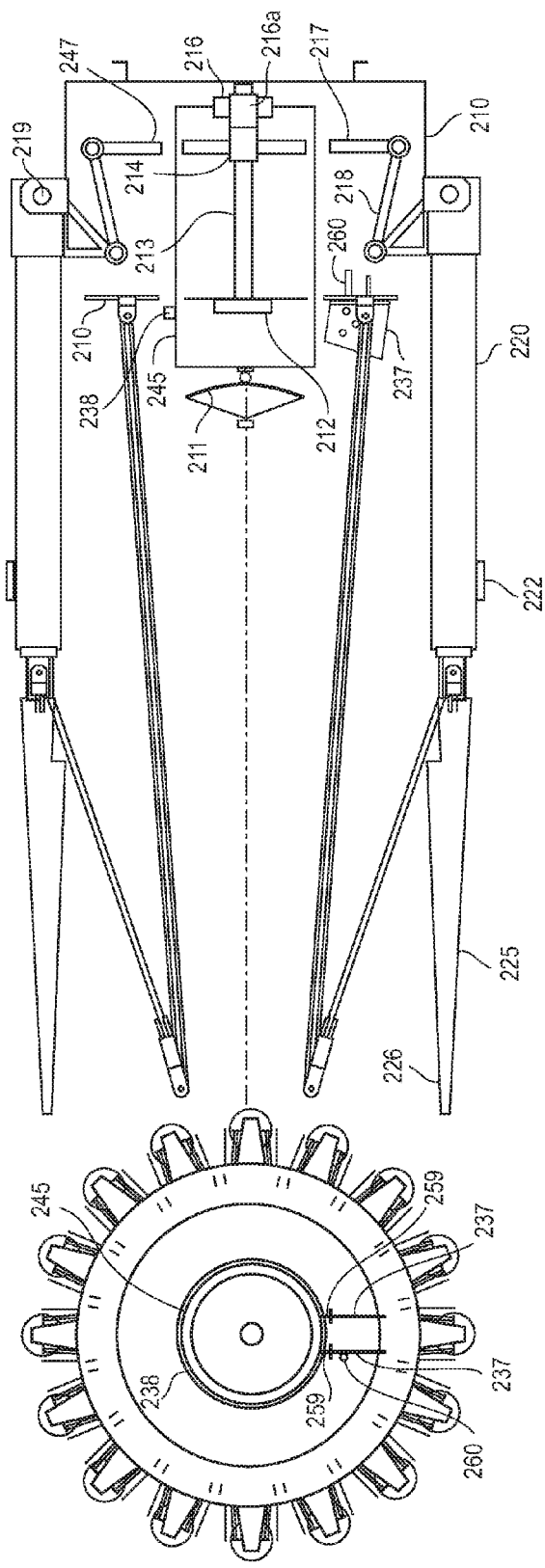

FIGS. 5-7 illustrate the stored tensegrity truss module 200. As seen in FIG. 5, the propulsion module 205 includes propulsion jets 206 disposed at different orientations in order to provide six DOF directional control. A docking flange 207 is attached to the propulsion module 205 opposite base 210 for separation from the upper stage of the booster and later in docking with the assembly module. A communication dish 211 and associated communications electronics (not shown) supports communications between the deployed starshade spacecraft while flying in formation with the telescope in the stellar coronagraph system; the dish needs to be positioned on the telescope side of the starshade. Booms 220 and truss struts 235 are connected to the base 210 by hinges 221 and 236, respectively. A guide plate set 237 and associated pivots 259 and turntable bearing 238, which are discussed later, provide an attachment mechanism for the stowed fan-fold covering that is used for fan fold deployment. The tensegrity superstructure 200 is shown stored in the Falcon 9 fairing 240 as a payload.

FIG. 6 shows a top view of the tensegrity superstructure module 200 and a section cut A-A identified for the section view A-A shown in FIG. 7. FIG. 6 is similar to FIG. 5 but is shown without the fairing 240 and the propulsion module 205. A boom restraint band 222 encircles and restrains the booms 220 during storage within the fairing 240 and maintains the booms substantially parallel to the longitudinal axis of the tensegrity superstructure module.

FIG. 7 shows section view A-A of the tensegrity superstructure module 200 with a corresponding top section view B-B. Interior elements of central hub 210 are viewable in section A-A and are responsible for pivoting the tensegrity booms 220 outward away from the longitudinal axis. A motor 212 is connected to and supplies rotational force for the drive screw 213. A drive nut 214 is fixed to the center of the common drive platform 217, and sits near the end of drive screw 213 when in the stored position. A central fan fold deployment hub 245 has dual purpose as a communication dish 211 platform, and is connected to the drive screw 213 using drive nut 216a which can be driven (rotated) by drive motor 216 as the last step in fan fold 315 deployment (this final motion is seen later going from FIG. 27 to FIG. 28 lowering fan fold into final position). As the drive screw 213 is rotated by drive motor 212, drive nuts 214 and 216a travel along the drive screw towards the motor 212 carrying common drive platform 217 and the fan fold deployment hub 245 with them. During the drive screw rotation, the common drive platform 217 is prevented from rotating by its connections to the plurality of drive links 218. Also during the drive screw 213 rotation, the fan fold deployment hub 245 is prevented from rotating by its penetrations 247 through the common drive platform 217 and base hub top 210 which permit translation but no rotation. A plurality of drive links 218 coupled together by a common drive platform 217, with drive nut 214 at its center, are moved by the drive screw 213 which is driven (rotated) by the drive screw motor 212. The common drive platform 217 is moved toward the drive screw motor 212 and the drive links 218 are dimensioned and positioned so as to transfer an outward force to each of the tensegrity booms 220 thereby causing the booms to rotate about pivot 219, moving away from the longitudinal axis and thus deploy in an opened position about 88.5° from the longitudinal axis. The boom rotation pivots 219 are essentially locked in deployed position when drive motor 212 is turned off. A STEM drive is housed in the base of each of the tensegrity booms 220 (such as disclosed in U.S. Pat. No. 5,315,795) and provides a drive mechanism to cause the concentrically stored telescoping sections of each tensegrity boom 220 to be extended outward along the axis of the boom until a final deployed length is achieved. For example, each boom 220 may have several telescoping sections that will form a tip to opposing tip diameter of the deployed starshade on the order of about 62 meters.

Figure 8:
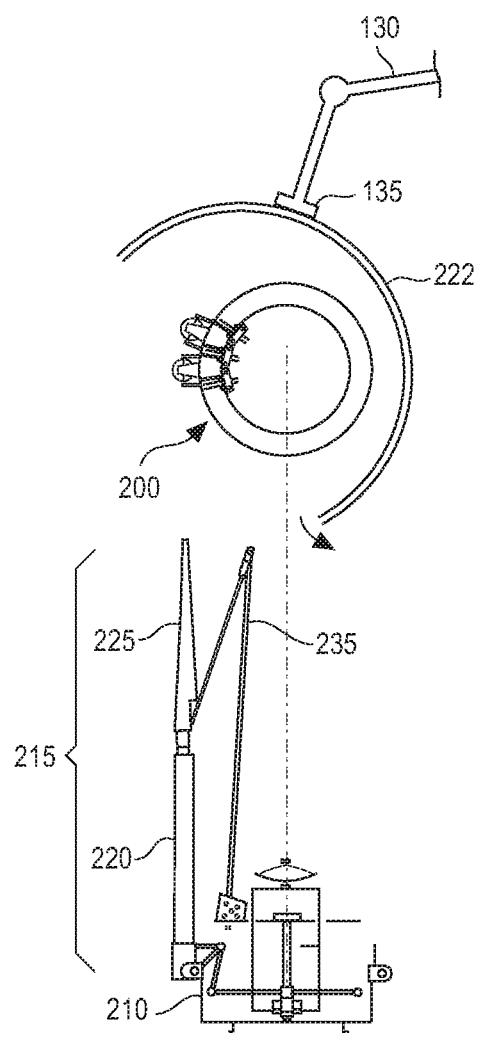
FIG. 8 illustrates a view of a portion of the tensegrity truss module having been released from storage.

FIGS. 8-12 illustrate the tensegrity truss module 200 in a series of deployment steps. These figures show a representative top and side view of the respective deployment steps. FIG. 8 shows that the boom restraint band 222 has been released and is being moved away by tool 135 of robotic boom 130. For simplicity, the propulsion module 205 that is attached to base 210 is not shown in these figures. Although not shown in these figures, the engagement apparatus 125 of robotic boom 120 remains attached to the propulsion module 205 as shown in FIG. 4 throughout these steps.

Figure 9:
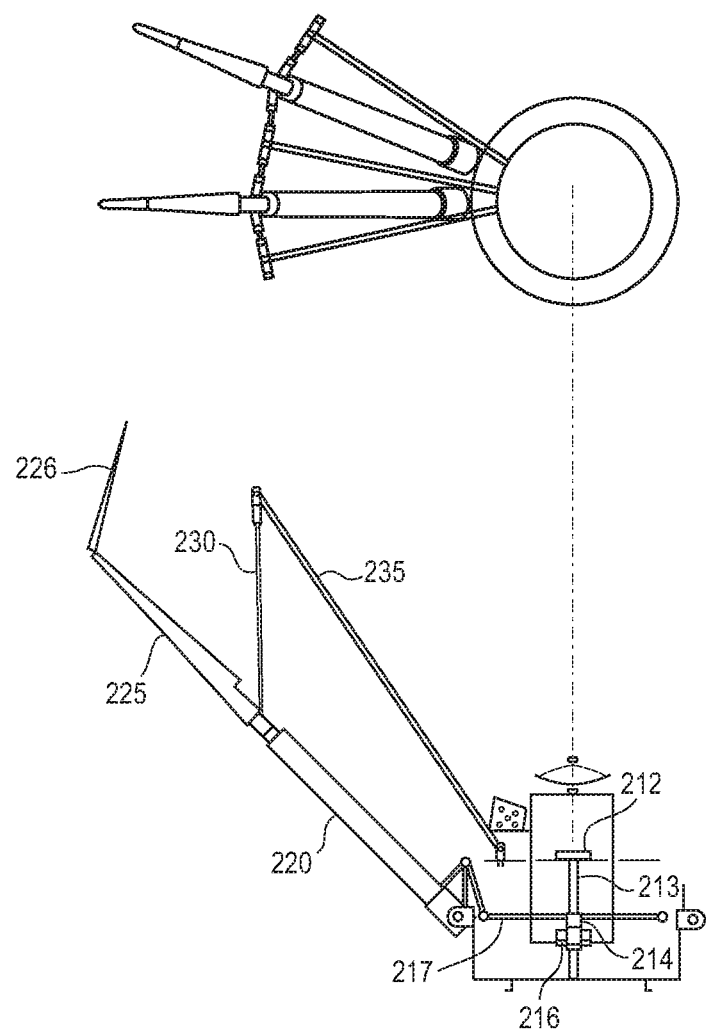
FIGS. 9-12 illustrate the tensegrity truss module in a series of deployment steps.

FIG. 9 shows that the tensegrity booms 220 are being forced radially outward away from the longitudinal axis. As shown, motor 212 has caused rotation of the drive screw 213 causing the drive nut 214 to push the common drive platform 217 closer to the motor 212 resulting in the drive linkages 218 applying force against the booms 220 causing the latter to rotate away from the longitudinal axis. During this motion drive nut 216a also moves up drive screw 213 moving the fan fold deployment hub 245 up by an equal amount as the common drive platform 217 (the second drive motor 216 and drive nut 216a is for fan fold deployment clearance in FIG. 27, and needs to be lowered into its final position using motor 216 as shown in FIG. 28). Also, a tapered end section 226 of the distal tip assembly 225 is unfolding about a hinge using spring deployment which is initiated passively by the radially outward motion of tip assembly 225.

Figure 10:
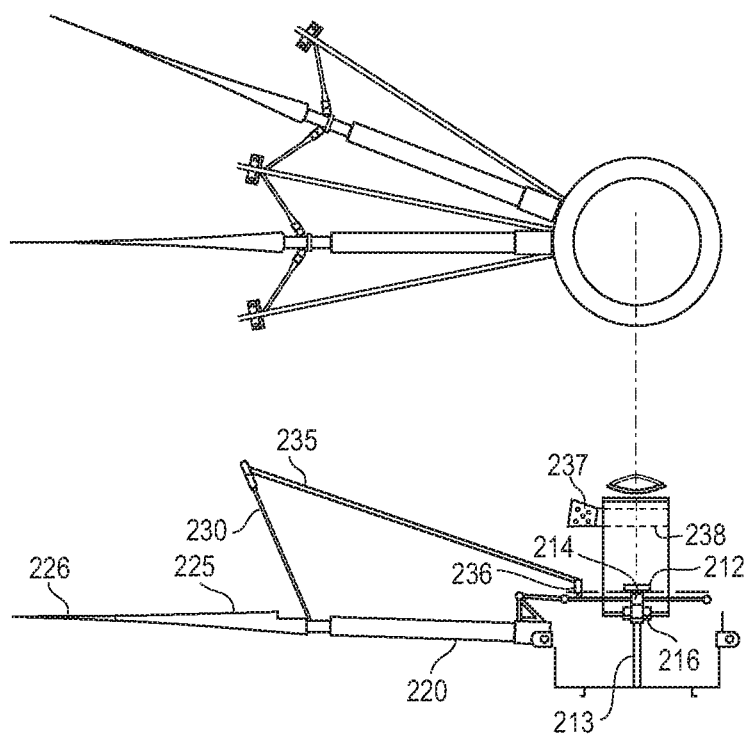

FIG. 10 shows that the tensegrity booms 220 have been rotated radially outward away from the longitudinal axis into a final position about 88.5° from the longitudinal axis (1.5° from horizontal). As shown, motor 212 has continued rotation of the drive screw 213 causing the drive nut 214 to push the common drive platform 217 substantially adjacent to the motor 212 resulting in the drive linkages 218 applying force against the booms 220 causing the latter to rotate to an almost perpendicular orientation to the longitudinal axis. Preferably, a torsion spring associated with the pivotal mount 236 of strut 235 maintains compression in telescoping struts 230 and 235 for added stability of the booms 220 and struts during deployment.

Figure 11:
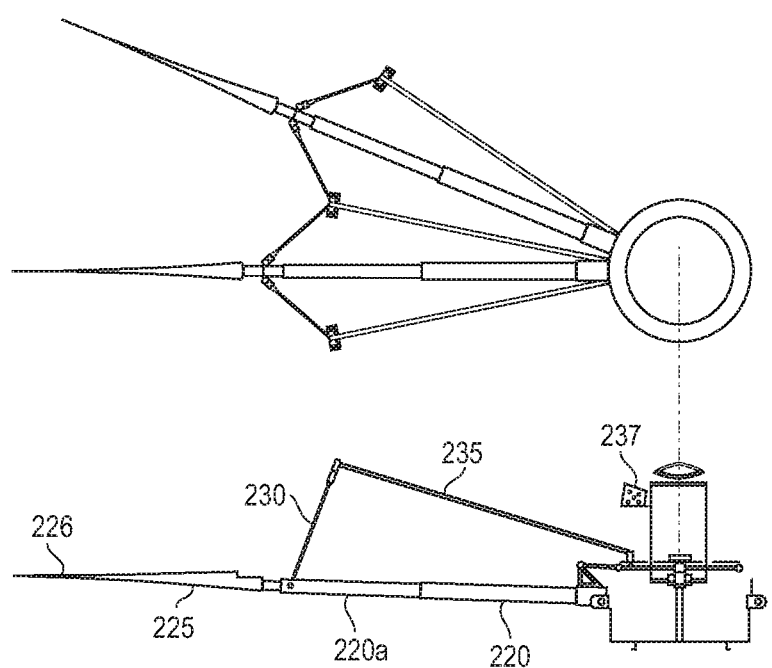
Figure 12:
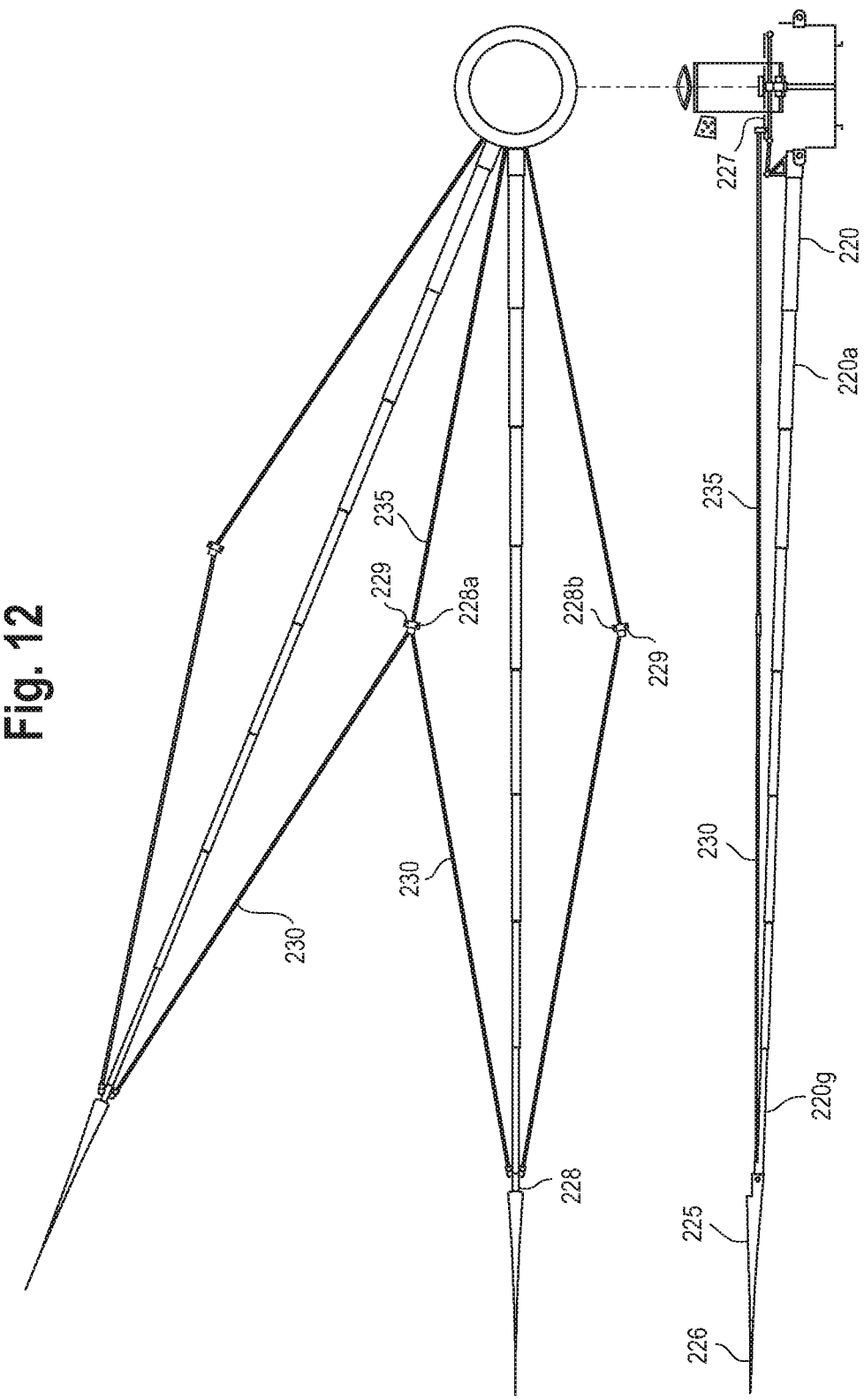

FIGS. 11-12 show a deployment stage substantially similar to that of FIG. 10 except that the STEM drive associated with each boom 220 has supplied a force causing a first telescoping section 220a to extend from each of booms 220. The process of extending consecutive telescoping sections from booms 220 continues until all telescoping sections have been extended as shown in FIG. 12. Preferably, as each consecutive telescoping section reaches its fully extended length, each section is snap locked into a fully extended position by a latch allowing the next consecutive telescoping section to be extended. Preferably, a compliance spring 227 begins to load struts 230 and 235 just before the last telescoping stage reaches its fully extended length. For example, the compliance spring 227 may apply a force of approximately 100 N of compression to each fully extended boom with the STEM drive being turned OFF. This tension against the rigid extended booms 220 facilitates a dimensionally stable superstructure.

Figure 13:
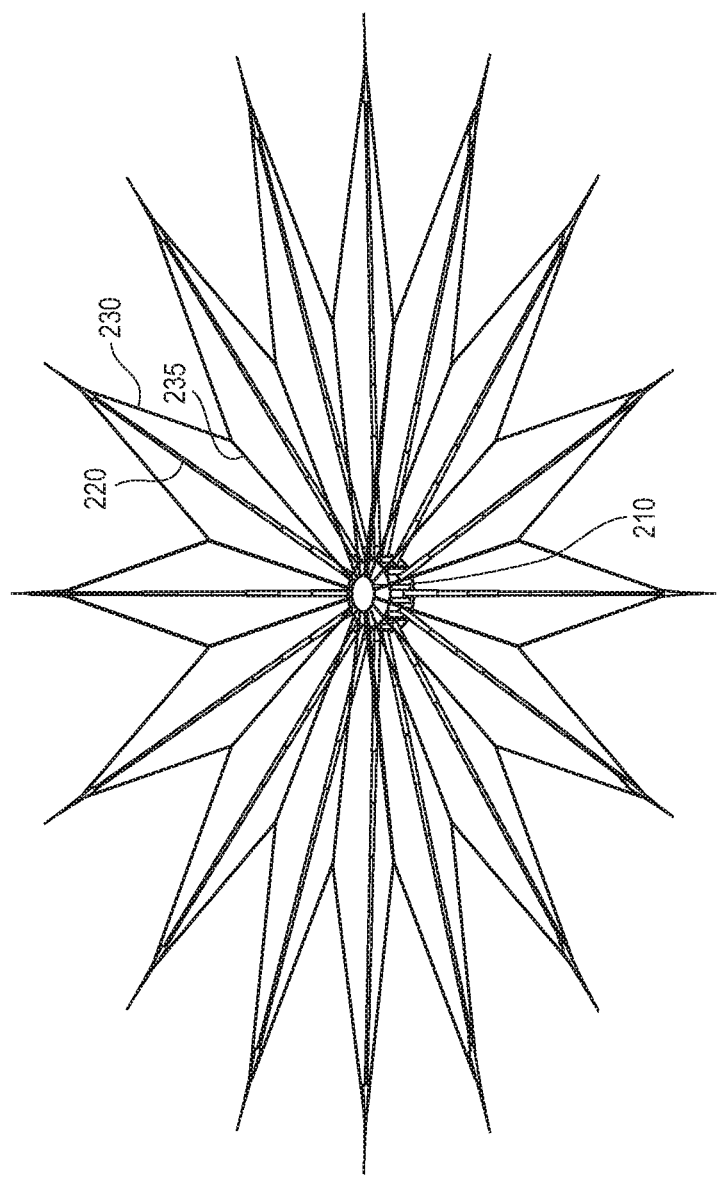
FIG. 13 illustrates the tensegrity truss module with its deployment completed.

FIG. 13 provides a prospective view of the tensegrity truss module 200 with its deployment completed. In the illustrated example, 16 booms 220 are fully extended and substantially reside in a nearly flat symmetrical conical frustum. The telescoping tension struts 230 and 235 are providing a compressive force to each boom 220 and lie substantially flat in a common plane.

Figure 14:
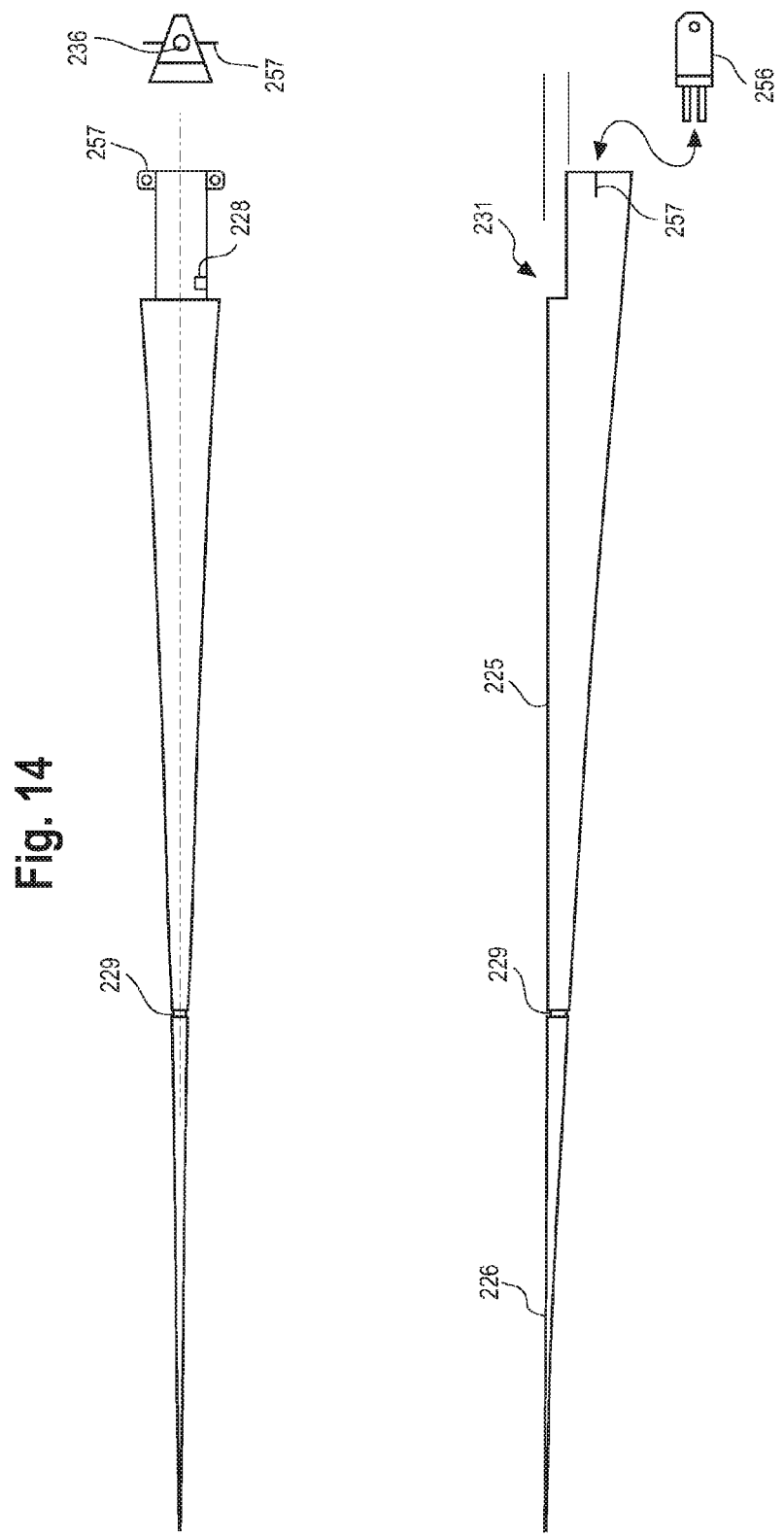
FIG. 14 illustrates a tip assembly disposed on the distal end of each of the booms of the tensegrity truss module.

FIG. 14 illustrates a tip assembly 225 that is disposed on the distal end of the last section of each of the booms 220 of the tensegrity truss module 200. The tapered end section 226 is attached to the larger tapered main body 225 of the tip assembly by a spring driven hinge 229 mounted below the external surface. The tapered end section 226 has a tapered section that can be machined as fine as 100 um for the truest possible, and preferred, hypergaussian starshade performance (although other starshade shapes also benefit from this feature which can be sized to larger widths also). The fine end of section 226 must be protected in a storage cavity during integration and launch, and one such cavity is provided within the larger tapered tip fitting 225 for it to reside protected from handling damage and launch concerns. FIG. 7 indicates where tapered end section 226 resides in a protected stored location for launch. Tapered end section 226 is released from its stored position on main body 225 by passive radially outward motion during deployment changes from FIG. 8 to FIG. 9; as lateral clearance increases due to outward radial motion, a spring driven shear pin is moved out of its locked position and tapered end section 226 is free to spring deploy about hinge 229. A fastener pattern centered about hole 236 supports the mounting of the tip assembly 225 to the last telescoping section of boom 220. A threaded hole 228 is disposed to receive a corresponding attachment/screw that facilitates mounting at this location of a petal. Preferably, a step down dimension 231 at the attachment end of the distal assembly 225 is substantially the same as the thickness of a petal to be installed on each boom to facilitate a partial overlap of the petal panel in the step down area. Two mounting lugs 257 provide attachment for tension struts 230 using a two axis clevis fitting 256 permitting the required motion of tension struts 230 during deployment.

Figure 15:
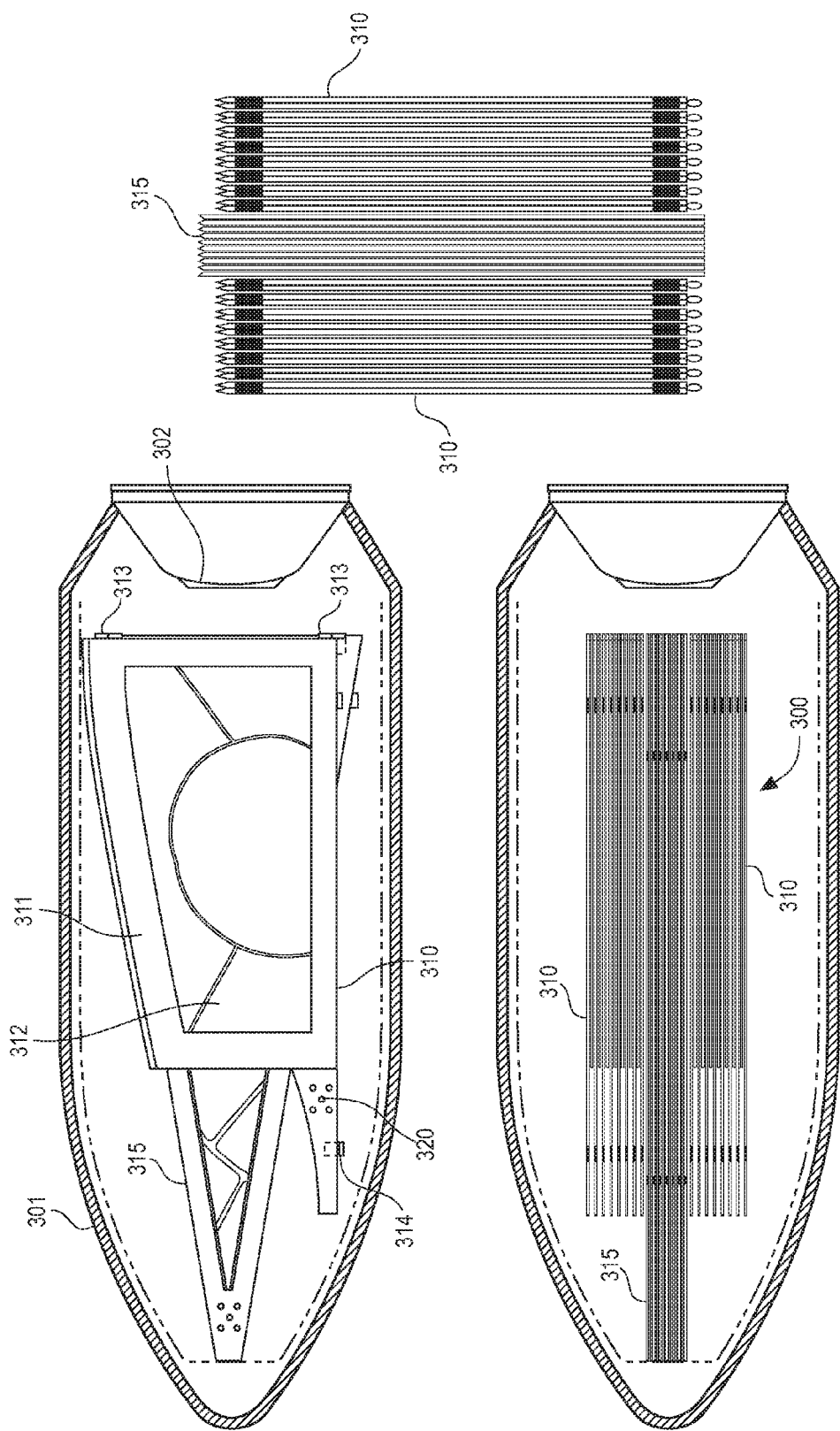
FIGS. 15-16 illustrate an exemplary embodiment of a stored petal pack and fan fold covering.
Figure 16:
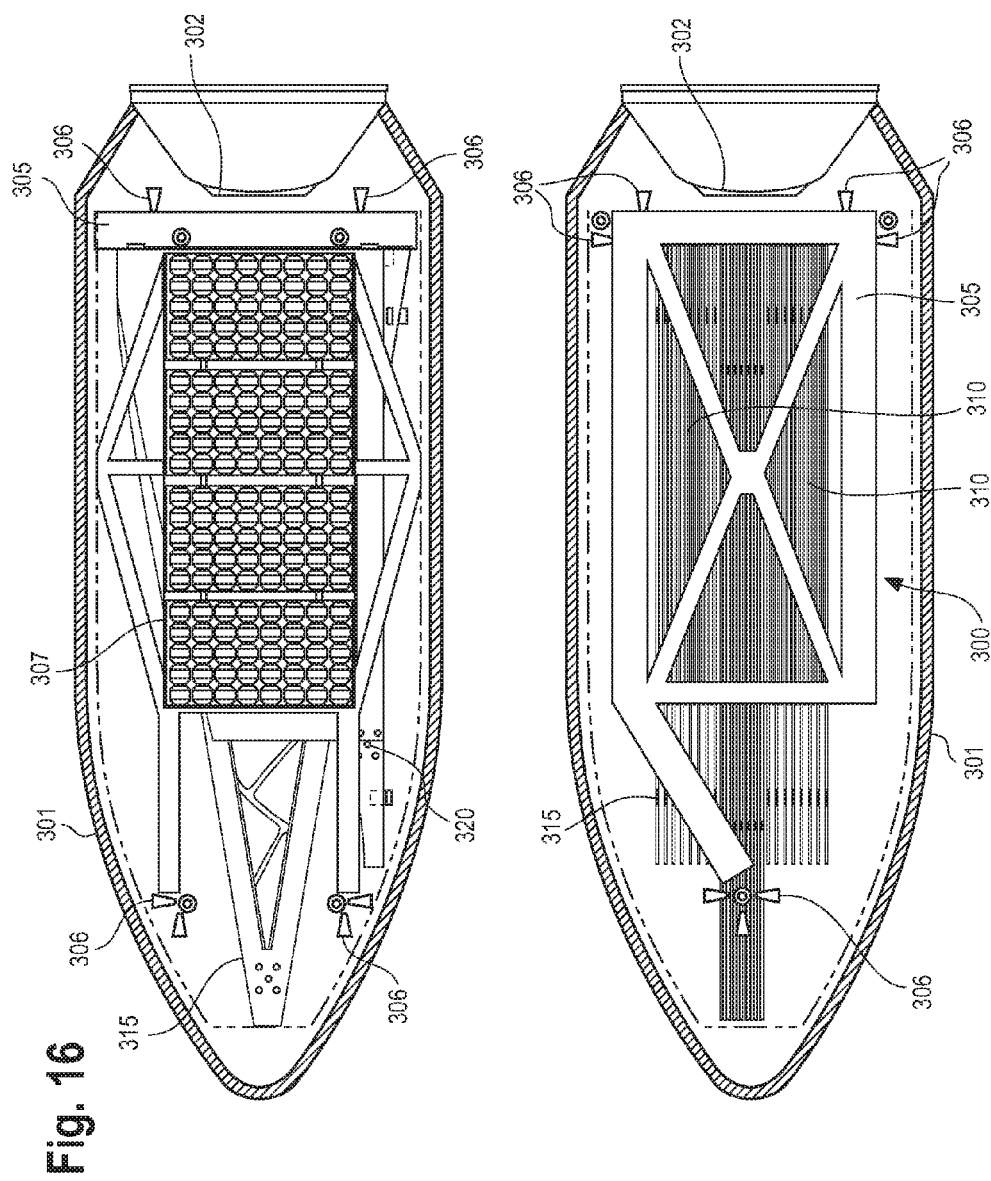

FIGS. 15-16 illustrate an exemplary embodiment 300 of the stored petal pack 310 and fan fold covering 315. A fairing 301 has a docking ring 302. The petals 310 are stored flat in two sets of 8 on either side of the fan fold covering 315. Each of the petals 310 have frames 311 that enclose an opaque covering material 312. As will be explained in more detail below, the frames of the petals 310 are folded and connected by hinges 313 and 314 to minimize the volume occupied during storage. Prior to mounting each petal 310 on a respective boom 220, the frames of the petals 310 are rotated about the hinges 313 and 314 to occupy a final fully extended position. The fan fold covering 315 has frames hinged in alternating zigzag folds to minimize the storage volume and is unfolded in the final deployment. A propulsion/panel caging mechanism 305 includes docking thrusters 306 and derives power from a fixed array 307 of solar cells.

Figure 17:
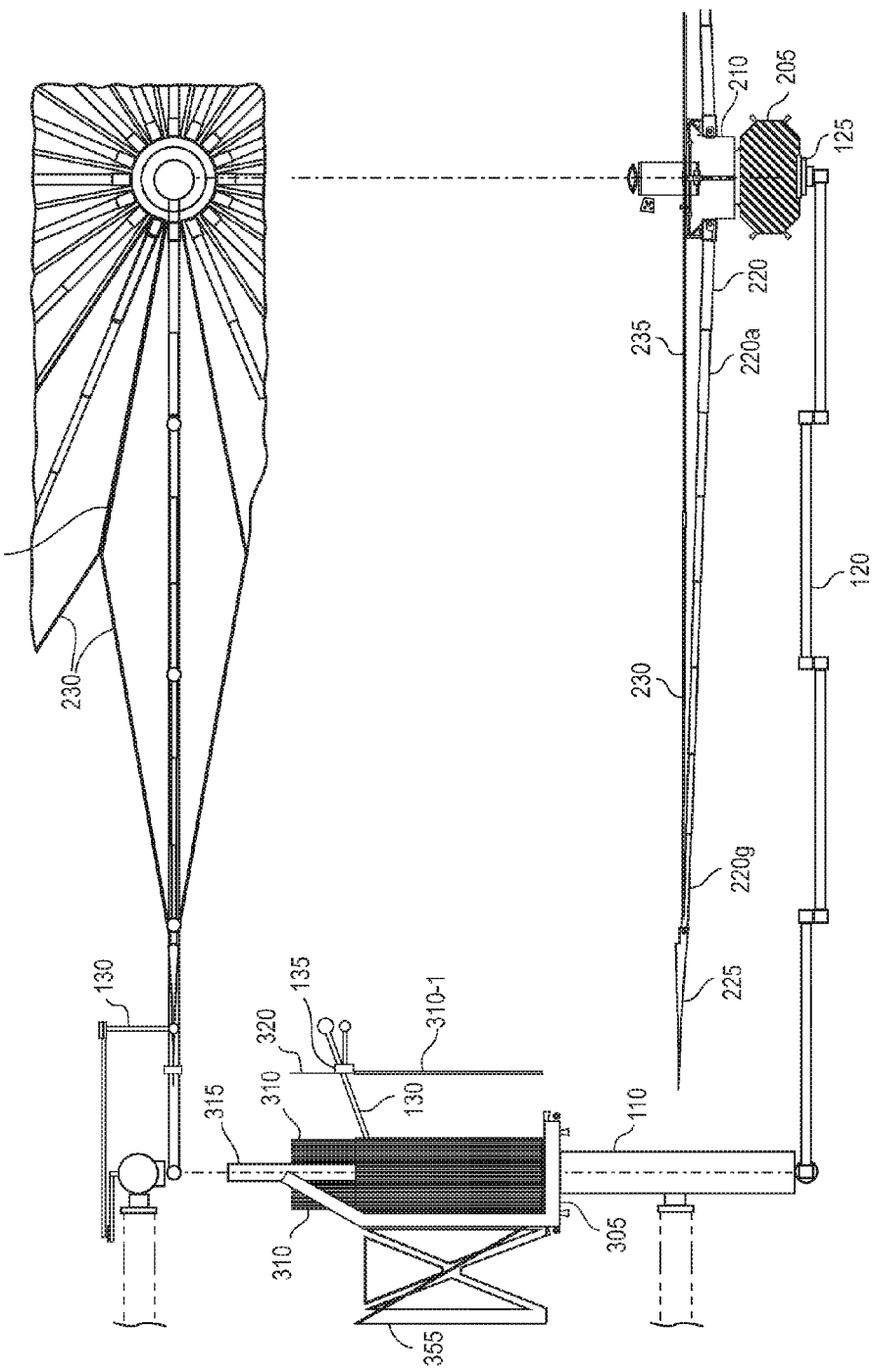
Figure 18:
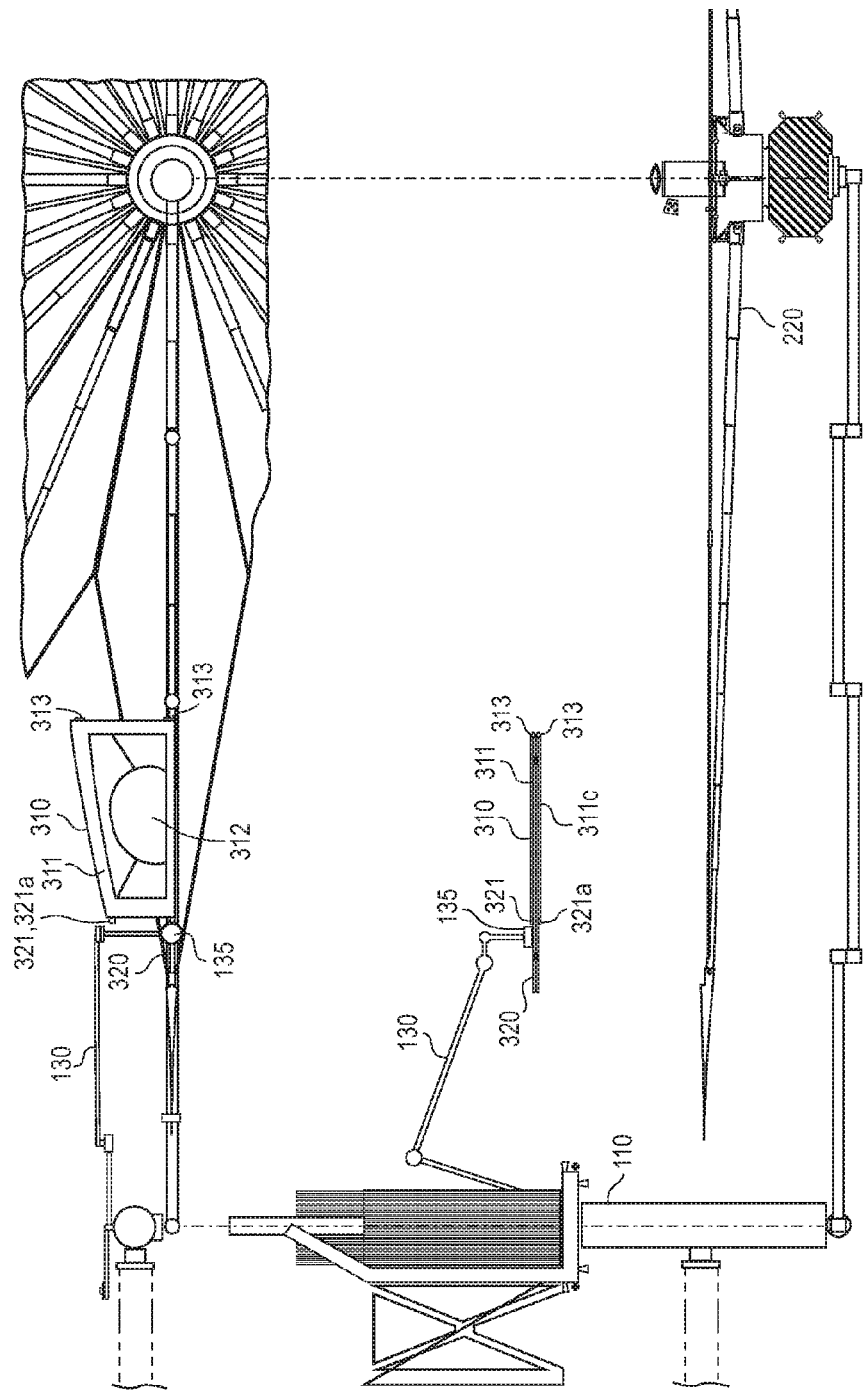
Figure 19:
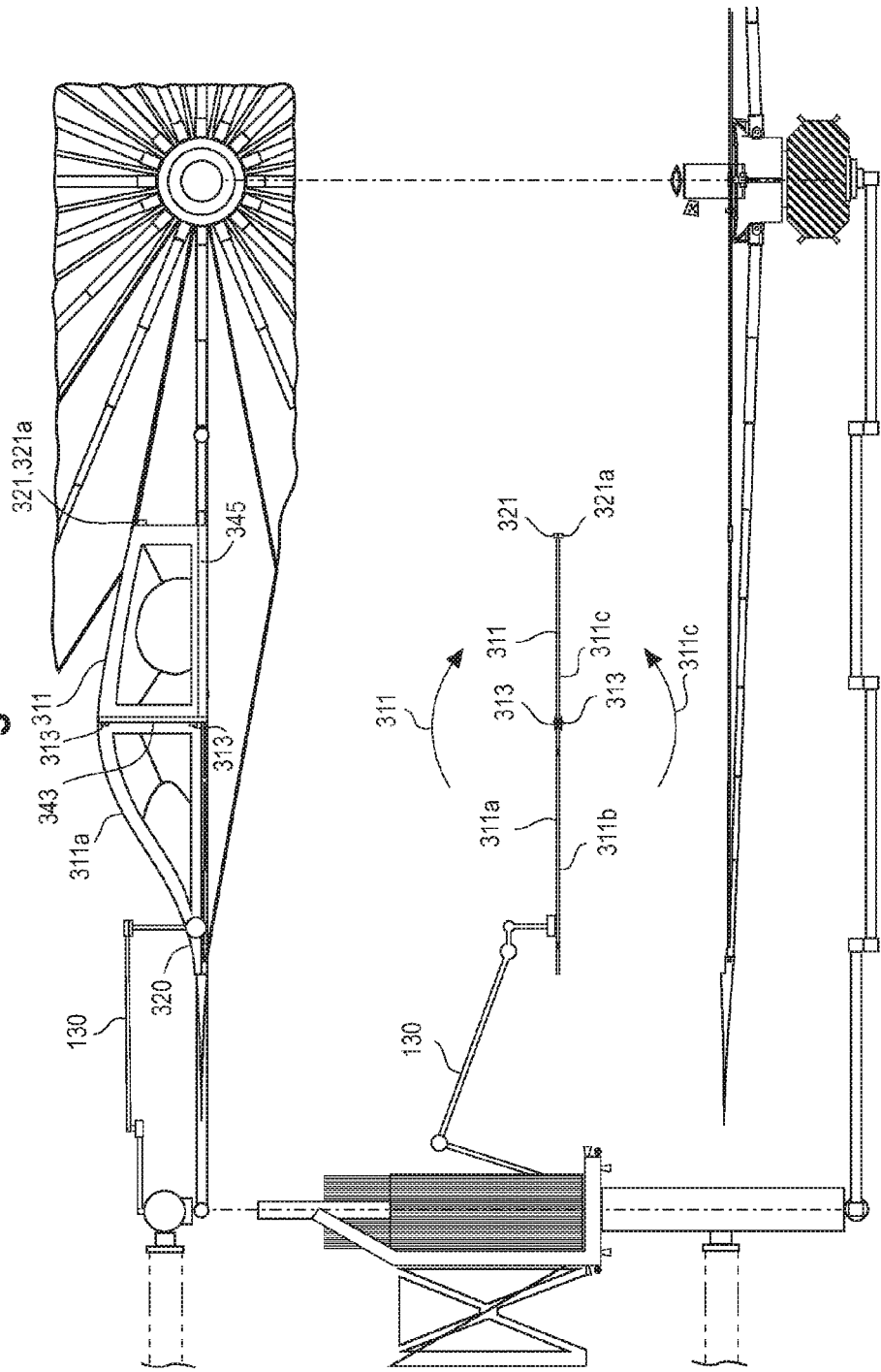
Figure 20:
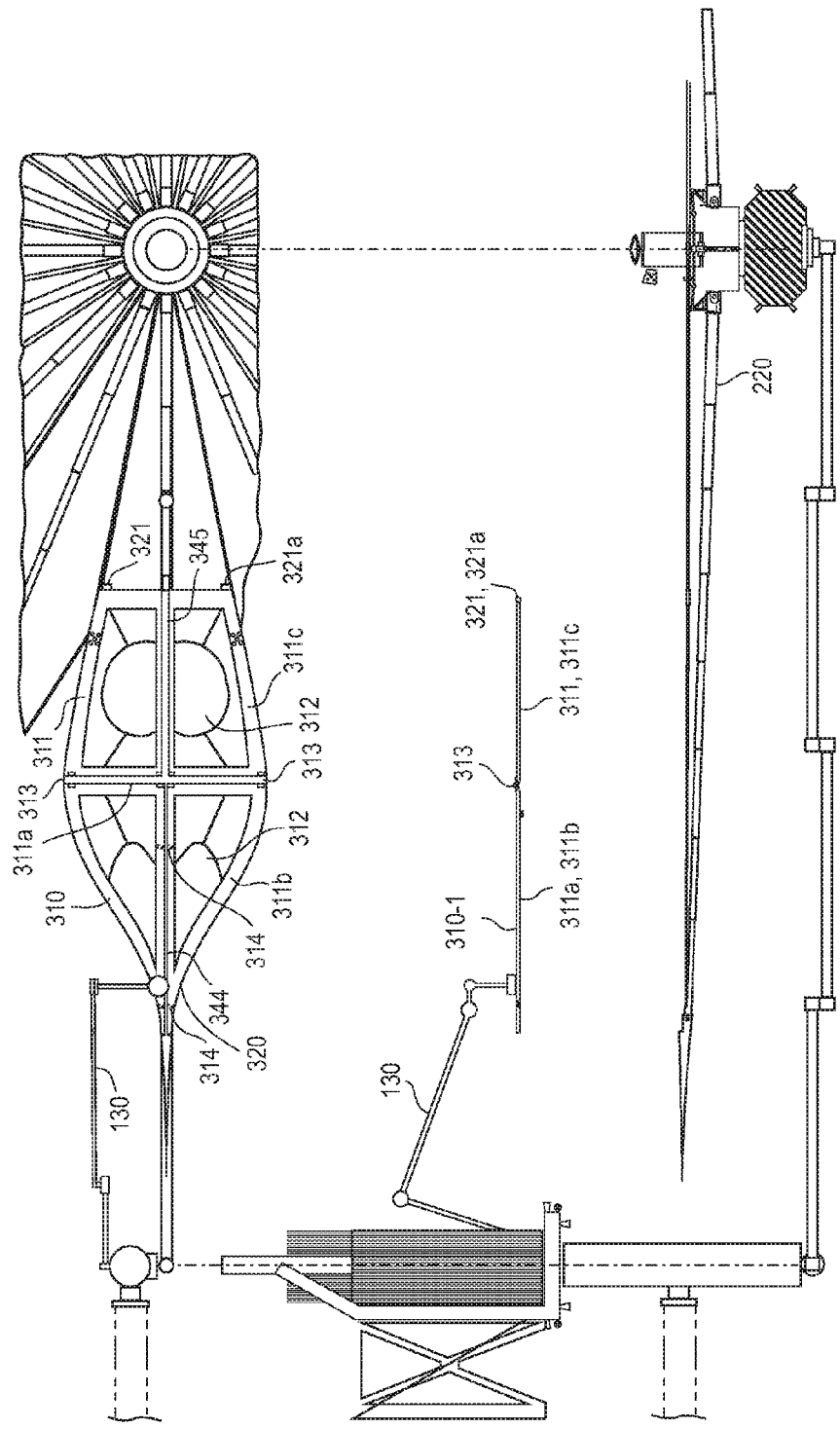

FIGS. 17-21 show exemplary deployment steps for a petal 310. These figures show both a partial side and top corresponding view of the corresponding steps. In these steps the propulsion & panel caging mechanism 305 has carried the petal and fan fold covering assembly and docked mechanically and electrically with an end of the anchor boom 110. It has unlocked and opened its caging structure 355 exposing petal 310-1 (the first of 16 petals to be removed). In FIG. 17, the tool 135 of movable boom 130 has engaged, mechanically and electrically, section 320 of the outermost stored petal 310-1 and this petal has been laterally moved away from the other stored petals. In FIG. 18 the boom 130 acting through tool 135 has moved the engaged petal 310-1 away from the anchor boom 110 and rotated the petal 90° so that the plane of the petal is substantially parallel to the extended tension struts 230 and 235 and has as much vertical distance as is required for frame 311c deployment clearance with struts 230. As best seen in the top view of FIG. 18, the plane of frame 311 of petal 310 is now parallel to the plane of the extended superstructure. As seen in FIGS. 18 & 19, a 2 piece locking device 321 (active half) and 321a (passive half) which is holding frames 311 and 311c together temporarily, is unlocked by sending an electrical signal to it (initiated by either astronauts or ground crew), permitting hinges 313 to spring deploy frames 311 and 311c. In FIG. 19 frame 311 has been rotated 180° clockwise about the upper two hinges 313 revealing the attached frame 311a; frame 311c has been rotated 180° counterclockwise about the lower two hinges 313. Both frames 311 and 311a are locked into place after deployment using latching hinges 313. Hinge lines 313 are both covered with a kapton flap 343 which is pre-sealed on both sides of the hinge line, providing a light seal over the hinge line gap; flap 343 unfolds during this deployment. In FIG. 20 frames 311b and 311c have been rotated 180° relative to corresponding frames 311a and 311 about hinges 314. Motion of hinges 314 are initiated passively using the last few degrees of motion in hinges 313 to unblock hinge 314 motion. Both frames 311b and 311c are locked into place after deployment using latching hinges 314. Hinge line 314 is covered with a kapton flap 344 pre-sealed on both sides of the hinge line, also providing light seal over the hinge line gap; flap 344 also unfolds during deployment. A kapton flap 345 is pre-sealed to only one side of the hinge line gap to frame 311, and comes into overlapping contact with frame 311c after hinge 314 deployment; this overlapping seam of flap 345 will be sealed in a later step. As seen in this figure, the petal 310-1 held by movable boom 130 (still attached at section 320) has been fully opened and is ready for deployment on a corresponding boom 220.

In FIGS. 20 and 20a, the opaque petal covering 312 now has adequate clearance to fully separate the covering's sub-layers 330. Petal covering 312 has two basic functions and must be as lightweight as possible; 1) provide highly opaque light cover, and 2) remain out of sunlight on the side of the cover that faces the telescope. No petal cover tensioning scheme is required to accomplish these two tasks, and is deliberately omitted from this embodiment to reduce unnecessary cost, weight and complexity. The starshade is typically aligned in space with sunlight illuminating only the side facing the star system being imaged, with a variety of non-perpendicular sunlight angles possible; as long as the layers 330 extend away from the mounting frames toward the star system side when they "pop-up" under z-stringer 331 force, the side facing the telescope will remain out of the sunlight. The layers are separated passively using light spring force from unfolding z-stringers 311, preferably made from very lightweight and thin kapton plastic sheet. The layers 330 and z-stringers 331 would be held flat, as shown in 333 in the lower portion of FIG. 20a, when stored for launch. The upper layer 330 in FIG. 20a is extended slightly longer than the other three layers 330 so that it can be directly attached to petal frames 311 and the fan-fold frames. As shown in FIG. 20a the telescope resides on the upper side of the view so the lower 3 layers 330 expand toward the star side of the starshade after z-stringers 331 straighten up under strain energy forces. The layer spacing 332 is closed out all around the blanket with a slightly slack and very thin kapton sheet. The upper layer 330 remains out of the sunlight on the telescope side since it doesn't "pop-up" relative to the petal frames 311. Even a very shallow or almost grazing sun angle won't illuminate covering 312 as long as the sun always comes from the star side of the starshade. The petal covering 312 is designed to be a very lightweight blanket, much lighter than petal and covering weights that would result from solid frames 311 and fan-fold frames with no openings. This very lightweight blanket design requires layer spacing 332 somewhat greater than the minimum required for micrometeoroid protection in space ($\sqrt{12}$ mm minimum—based on test results) for a considerable amount of time. Four adequately separated thin layers, preferably made from very thin kapton film with vapor deposited aluminum coatings on both sides, are believed to be adequate to provide the opacity required after micrometeoroid impacts hit the blanket from both sides for a considerable amount of time in space. A thermal coating is required on the outer facing surface in order to maintain reasonable temperatures and structural integrity of the covering. Since the starshade's optical element properties are derived primarily from the starshade's perimeter edge, it is the intention of this embodiment that the petal covering 312 should preferably be rigged so that it never becomes tensioned under the most extreme temperature environments in space. Tension loads in the petal covering 312 would create undesirable (and potentially very high) distortion loads on the petal frame 311, thereby distorting the primary optical element properties undesirably. Conversely the maximum petal covering slack should preferably never permit the petal covering 312 to have its side facing the telescope be illuminated by sunlight.

In FIG. 21 the petal 310-1 (the first petal to be deployed) has been positioned by movable boom 130 to engage the starshade truss centered along boom 220. Another tool 136 of movable boom 130 installs a screw or other fastener device through a clearance hole in the frame 320 of petal 310-1 into the corresponding threaded receptacle 228 of the distal end 225. Similarly, second and third fasteners are secured through corresponding clearance holes in frame 311 and 311c by tool 136 of movable booms 130 into corresponding threaded receptacles 228a and 228b of a plate 229 disposed at the juncture of struts 230 and 235 (see FIG. 12). In order for boom 130 to reach the location for securing the second and third fasteners, the starshade truss is rotated slightly at the actuator of boom 120 concentric with docking ring 125, and moveable boom 130 retracted to bring the base 210 closer to the anchor boom 110. The rotation is needed so that the distal end 225 of boom 220 on which the corresponding petal is being attached is offset and does not undesirably contact/hit the anchor boom 110. Following the installation of the second and third fasteners, boom 120 is again extended and the starshade truss rotated to align the anchor boom 110 with the next boom 220 to receive a petal.

FIG. 22 illustrates the completed deployment of the first 8 petals 310-1 through 310-8. The petals 310-2 through petals 310-7 are consecutively installed similarly to the previously described deployment of petal 310-1. FIG. 22 illustrates that following the deployment of the first eight petals 310 the stored fan-fold covering 315 is now exposed to boom 130 and available to be deployed.

Figure 23:
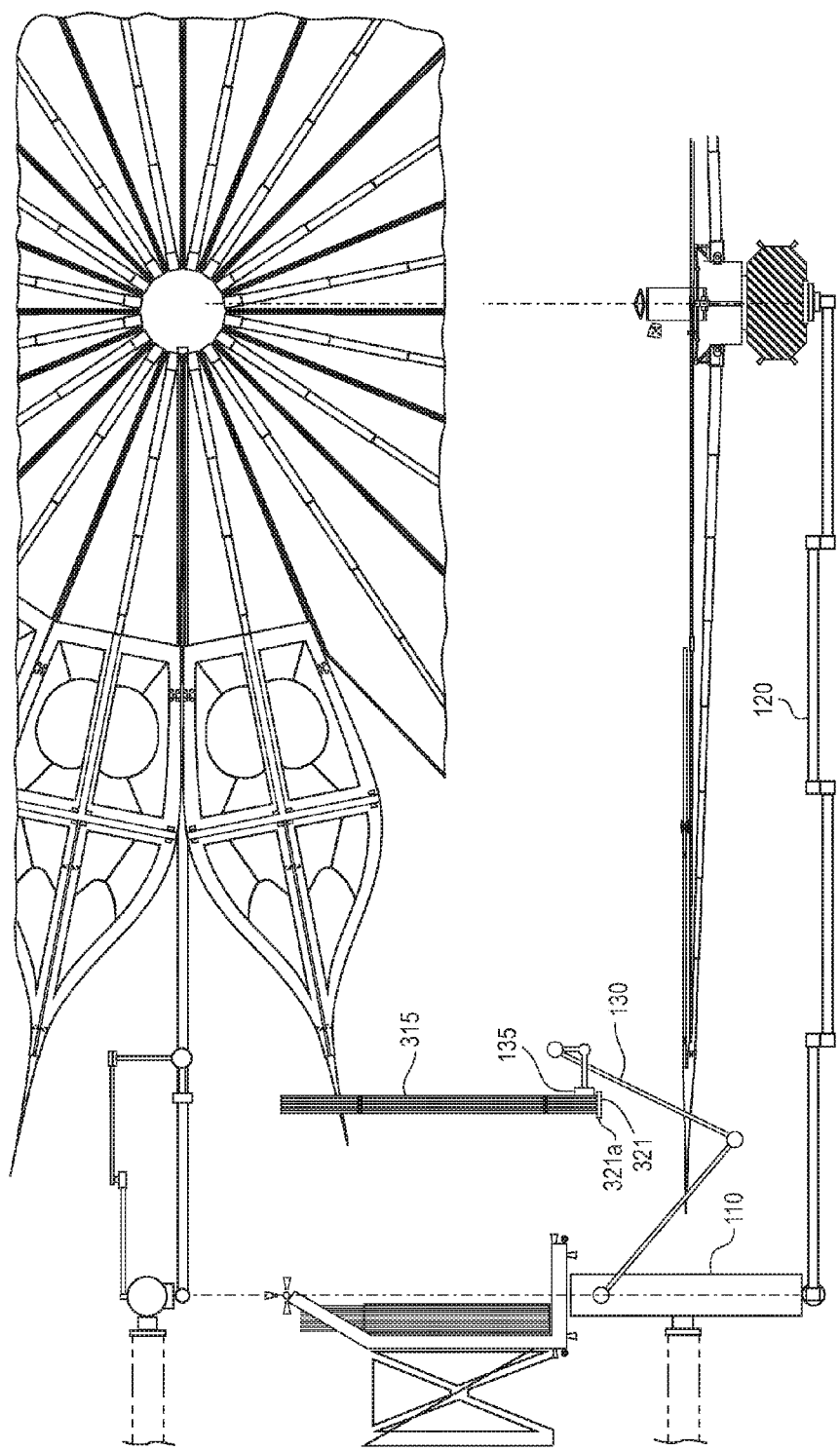
FIGS. 23-25 illustrate steps in the deployment of the fan fold covering.
Figure 24:
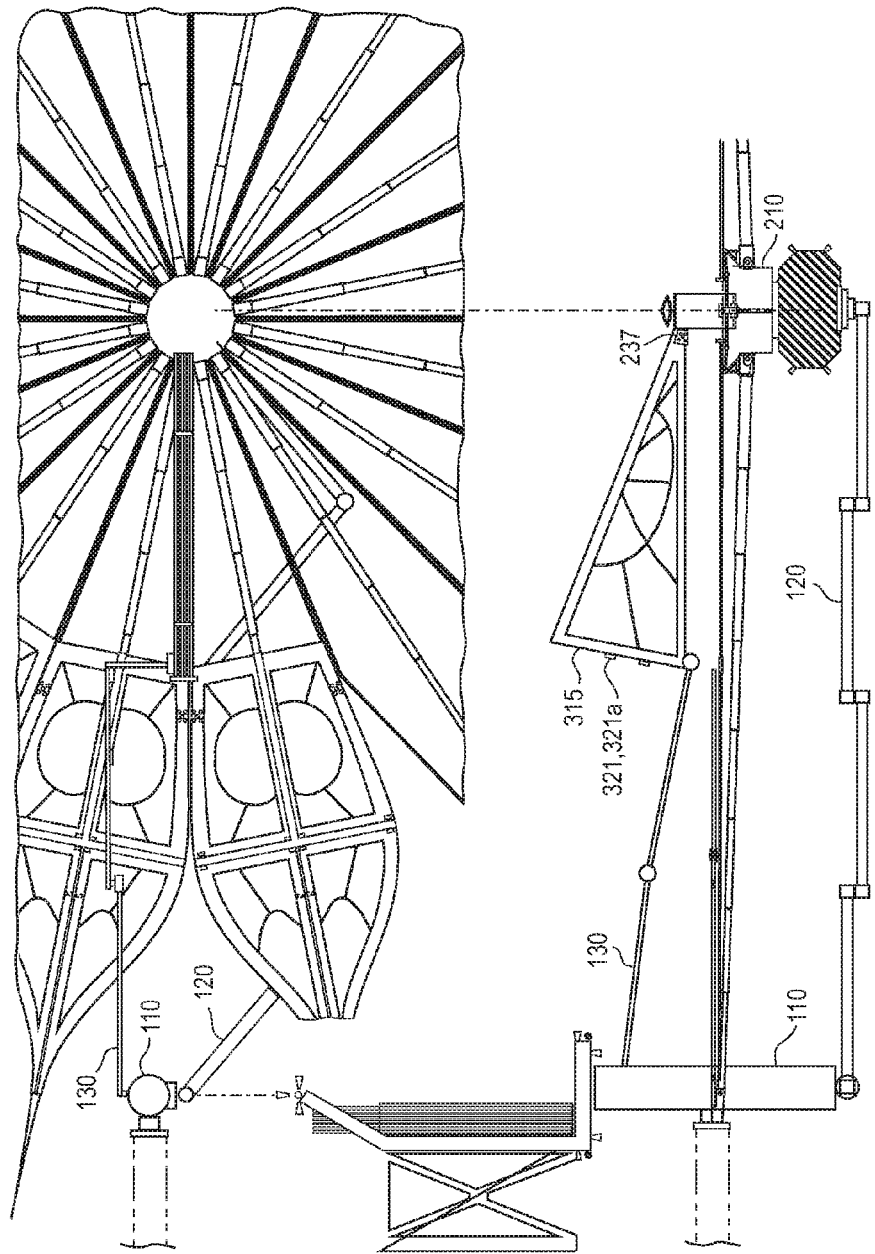

FIGS. 23-24 illustrate steps in the deployment of the fan fold covering 315. FIG. 23 shows that the fan fold covering 315 has been removed by boom 130, engaged mechanically and electrically at tool 135, from its storage location in preparation for it being installed on the starshade superstructure. In FIG. 24 moveable boom 120 brings the base 210 closer to the anchor boom 110 and boom 130 is extended to position the end of the fan fold covering 315 to engage and attach to guide plate set 237. Seen also in FIG. 7 guide plates 237 are linked to drive hub 245 using pivots 259 and turntable bearing 238 which facilitates opening of the fan fold covering 315 about the axis of the starshade superstructure. One of the pivots 259 is connected to the rotating race of turntable bearing 238 and the other pivot 259 is connected to the fixed turntable bearing 238 race. The fan fold's outer two panels each have tapered end guides located at the ends of the panels that engage guide plate set 237; the end guides permit ease of installing the fan fold 315 into the guide plate set 237, as well as a mechanical snap action (leaf spring like) latch for each of the outer two panels. The radial motion of the fan fold into guide plate set 237 locks the outer two panels to their mating guide plates mechanically. After the fan fold's outer two panels are secured to mating guide plates 237, a two piece locking device 321 (active half) and 321a (passive half) which is holding all 16 of the fan fold frames together temporarily, is unlocked by sending an electrical signal to it (initiated by astronauts or ground crew). At this point the fan fold will self-deploy after the guide plate connected to the rotating turntable bearing has been released (in a later step).

Figure 25:
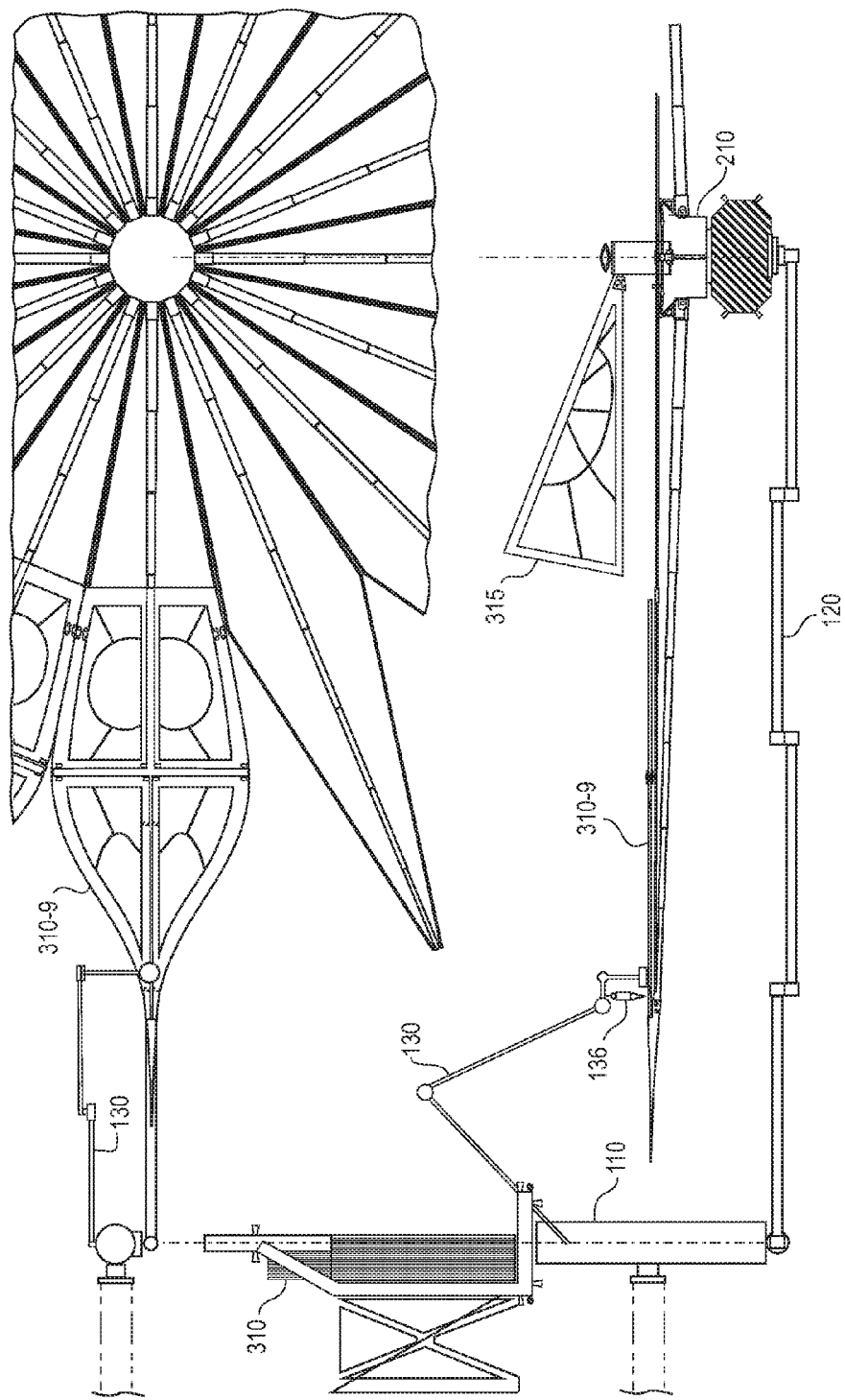
Figure 26:
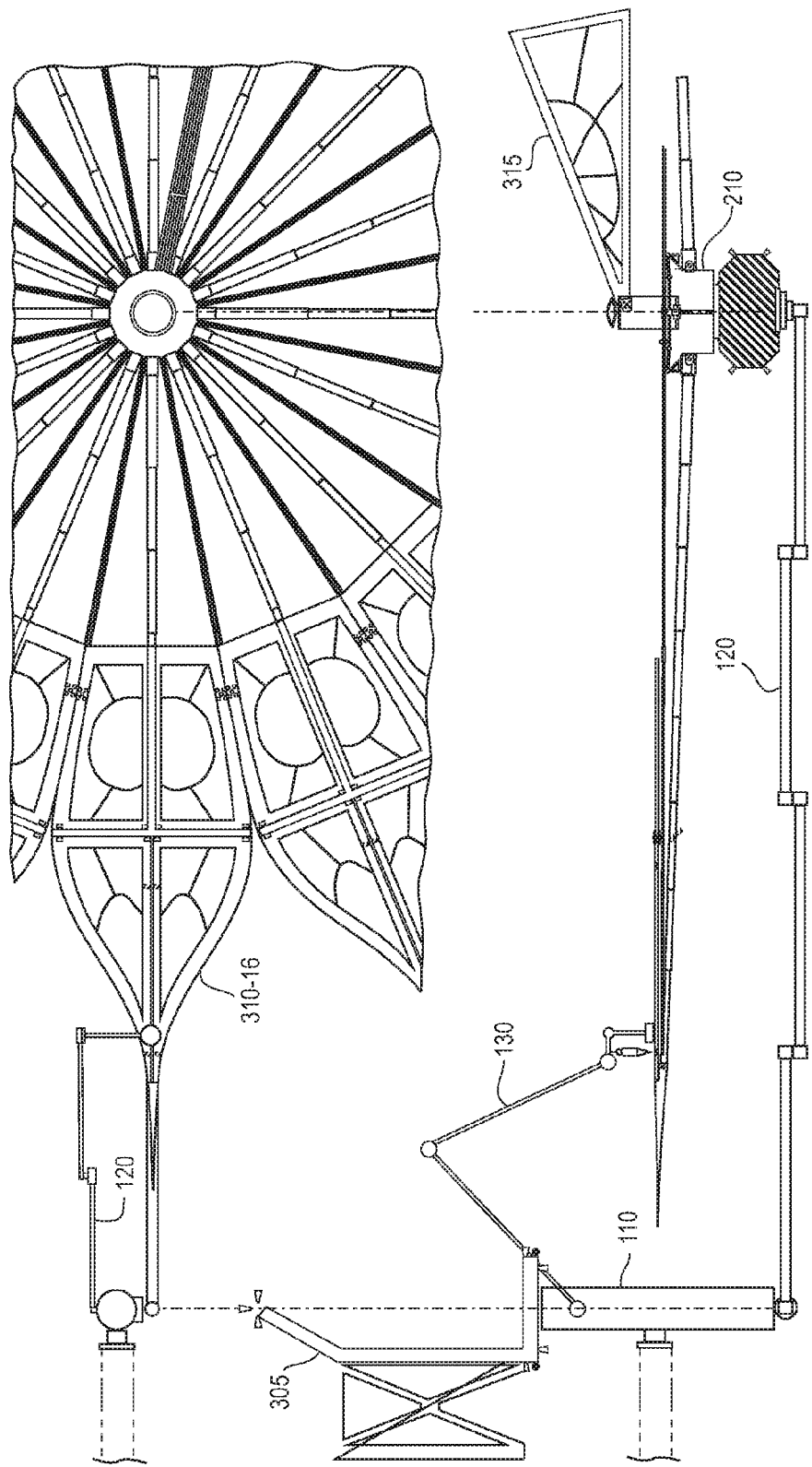
FIG. 26 illustrates the deployment of the last 8 petals.

FIGS. 25-26 illustrate the deployment of the last 8 petals. In FIG. 25 boom 120 has extended the base 210 further away from the anchor boom 110 in a position to facilitate the installation of petal 310-9 by boom 130. As shown, petal 310-9 has been deployed and is being secured by tool 136 at the first location nearest the distal end. As explained previously with regard to the installation of the first petal, the starshade superstructure is rotated and the base 210 brought nearer the anchor boom 110 to permit boom 130 to reach the second and third installation locations of the petal. FIG. 26 shows the last petal 310-16 being deployed in a similar manner. It will be noted that the propulsion & caging mechanism 305 attached to one end of anchor boom 110 is now empty as all of the petals 310-1 through 310-16 and the fan fold covering 315 have been deployed.

Figure 27:
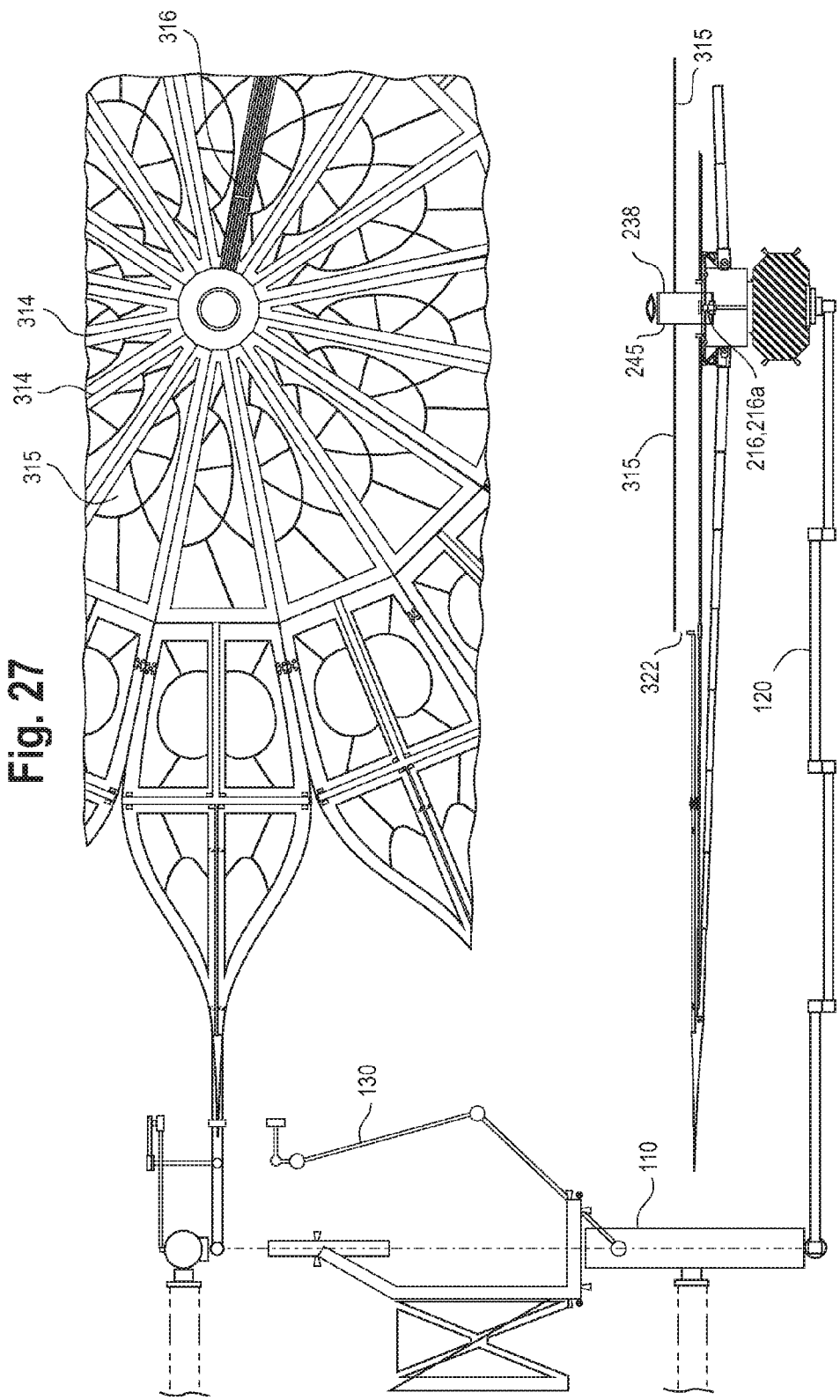
FIG. 27 illustrates the unfolding of the fan fold covering.
Figure 28:
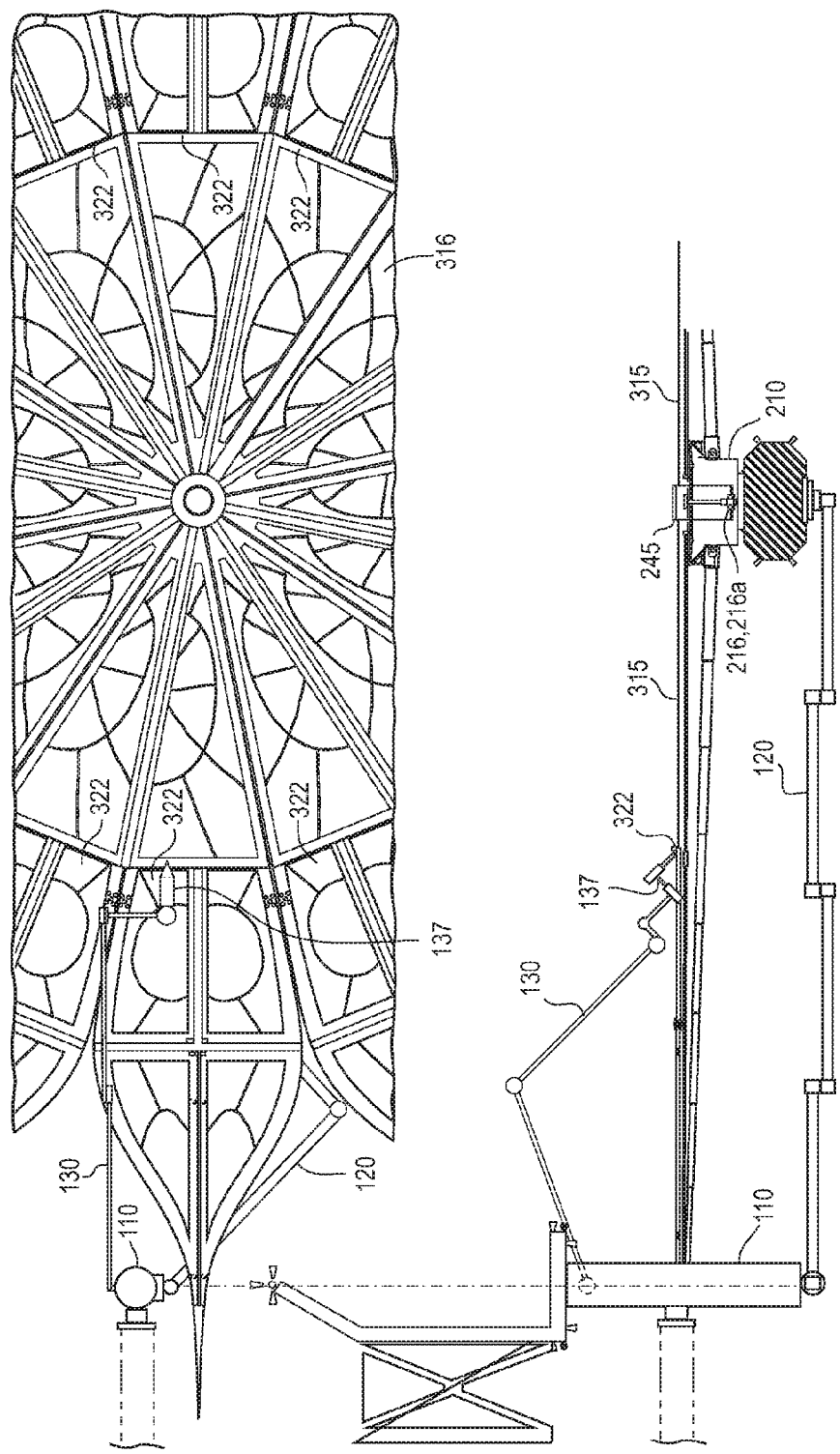

FIG. 27 illustrates the unfolding of the fan fold covering 315. An electrical signal is sent through the assembly module boom 120 and tensegrity truss module 200 to pin puller 260 shown in FIG. 7 (by either astronauts or ground crew). Pin puller 260 retracts to below the top of base module 210, and the guide plate 237 connected to the rotating race of turntable bearing 238 through pivot 259 is free to rotate on the turntable bearing. The corresponding 16 sections of the fan fold covering 315, driven by spring loaded hinges at each of the fan fold section connections are then self-deployed. The pivot 259 connecting the rotating guide plate 237 is deployed 337.5° around the central axis while each pivot 259 permits 90° rotation of the outer two fan fold sections (with respect to bearing race attachments), and all interior fan fold hinges deploy 180° and latch. The deployed result is a flat 360° circular (with 16 facets) fan fold 315, where preferably, an overlapping Kapton flap 316 is disposed between the first and last panels of the fan fold covering 315. One side of Kapton flap 316 is pre-sealed to the first fan fold panel and the other side of flap 316 overlaps substantially the last fan fold panel and is seamed with space qualified adhesive along this radial line to provide a light tight seal. Seams 314 exist between each of the panels of the fan fold covering hinge line gaps on alternating sides of the fan fold (i.e. near side, far side, near side, far side etc.) and are pre-sealed at the factory before launch so they unfold during fan fold deployment. The material interior of the frames of the fan fold covering may be a lightweight multi-layer blanket as described in FIG. 20a, or other suitable material. Finally, the motor 216 drives (rotates) drive nut 216a and the fan fold deployment hub 245 and fan fold 315 are lowered creating overlapping contact 322 between the fan fold 315 and the petal frames 311. Sufficient travel exists along drive screw 213 to move drive nut 216a approximately 50-100 mm beyond first contact between the fan fold panels and the petal frames 311 so a light preload will be developed between the two after motor 216 is turned off.

FIG. 28 illustrates sealing the overlap 322 between the fan fold ends 315 and the petal frames 311. Boom 120 has drawn the base 210 nearer the anchor boom 110 and rotated boom 120 actuator at docking ring 125 so that boom 130 will have sufficient reach to cover one segment of the fan fold overlap 322 at a time. A tool 137 attached to the boom 130 applies an opaque space qualified sealant all along the illustrated fan fold overlap 322. The superstructure is moved further away and rotated, and the same process repeated so that each of the 16 overlaps 322 of the fan fold covering 315 are sealed to prevent light leakage.

FIG. 28a illustrates sealing the fan fold overlapping flap 316. Base 210 is rotated aligning the overlapping flap 316 with boom 130, and boom 120 pulls base 210 in closer so that boom 130 using tool 137 attached can seal the side of 316 flap overlapping the last fan fold panel.

Figure 28B:
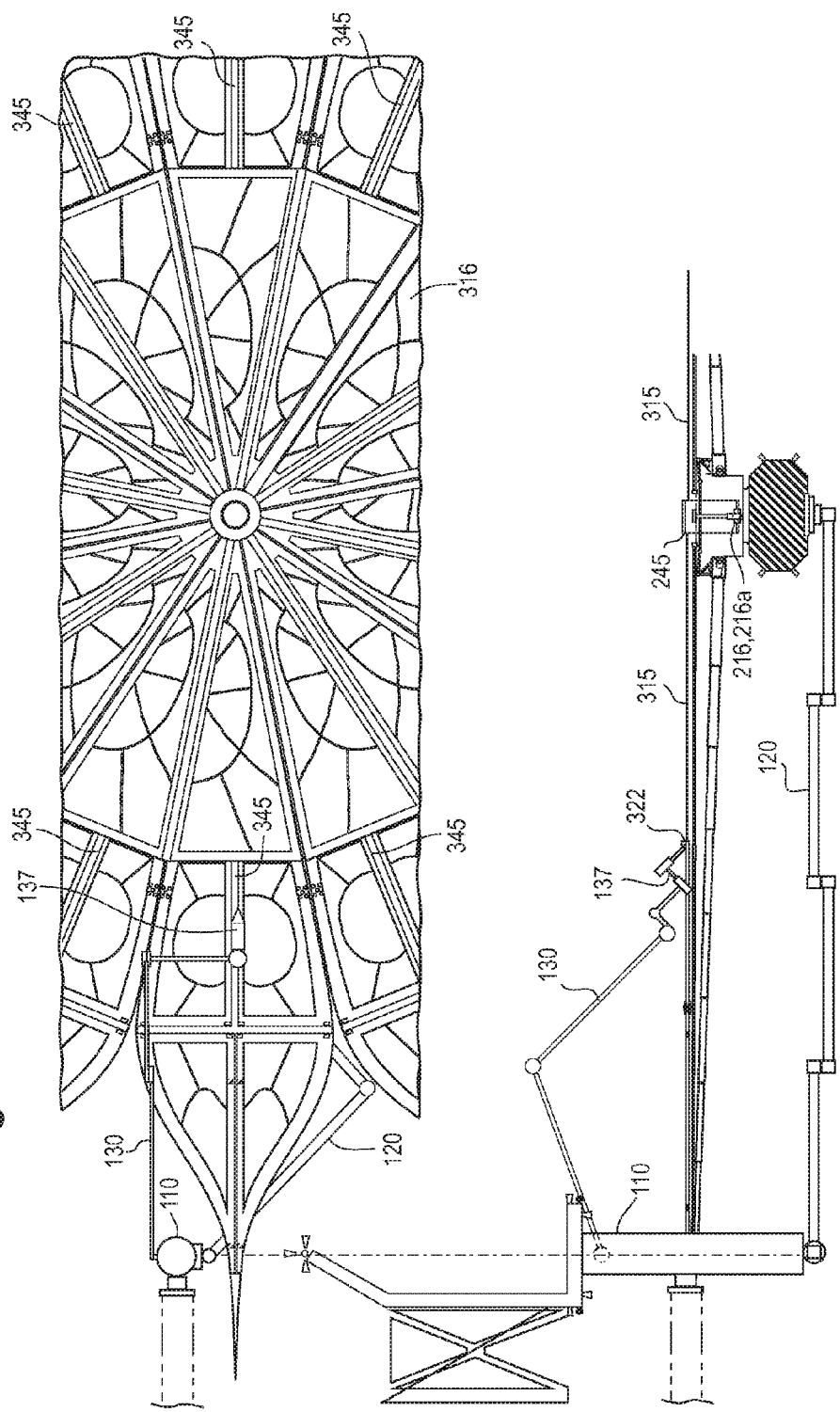

FIG. 28b illustrates sealing petal flap 345. Boom 120 has drawn the base 210 nearer the anchor boom and positions flap 345 one petal at a time while it seals one edge (where the other edge of flap 345 is pre-sealed). The process is repeated 16 times.

Figure 30:
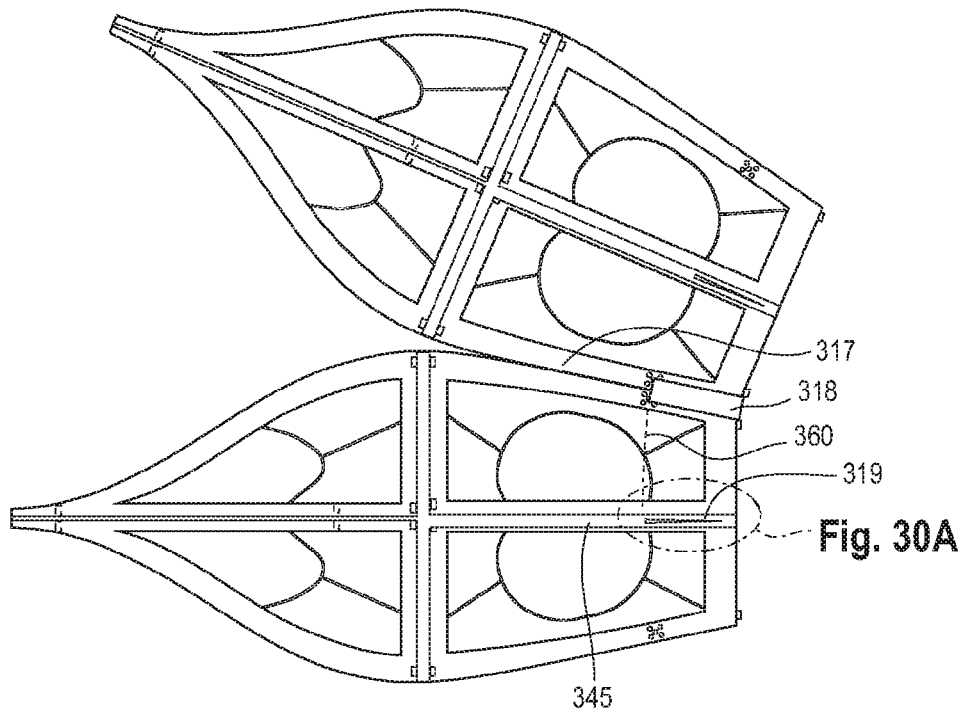
FIGS. 30 and 30A illustrate the relationship between the valley gap extension and associated valley gap flap.
Figure 30A:
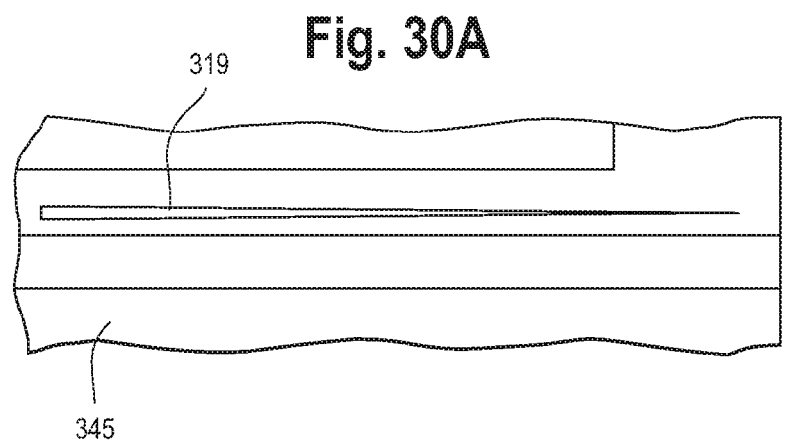

FIGS. 29-30 illustrate the installation of valley gap flaps 318 installed at valley gaps 317 between adjacent petals 310, and aligned radially per FIG. 30. FIG. 30 illustrates the purpose of the valley gap flaps 318 and associated valley gap extensions 319. The gap between adjacent petals forms a steep valley shape with a gap that gets smaller as its radial position gets closer to the center of the starshade. As the valley gap gets smaller than about 2 mm the shape control tolerances (total combined effects of petal edge machining, positioning, thermal and dynamic distortion), begin to consume a large portion of the total gap width. This adverse gap tolerance condition can cause the gap to either get too large (large percent change in gap width), or completely close which effectively moves the radial position of the gap termination by large distances creating a starshade performance concern. The valley gap flap 318 terminates the valley gap 317 at a nominal 2 mm gap width (where 2 mm is a somewhat arbitrary transition gap which can be increased if needed to increase alignment tolerances) and a valley gap extension 319 is machined directly into the starshade panel frame in a rotated location as an opening, or cutout permitting starlight to pass though. The termination of the standard valley gaps 317, by the valley gap flaps 318, are aligned per arc 360 in the same radial position as the large 2 mm wide end of the valley gap extension 319. Production techniques can be used in this highly controlled valley gap extension 319 region which permit extending the valley gap to as fine as 50 um width, with very precise gap width and radial termination location tolerances; the 11.25° rotation of the valley gap extension relative to the standard valley gap 317 has no functional effect on the shadowing performance of the starshade provided alignment 360 is done to a relatively fine precision. It should be noted that alignment 360 is a circular arc concentric with the starshade center. Each of the 16 gaps 317 between adjacent petals 310 near the fan fold covering 315 are covered with an opaque flap 318 by tool 137 of boom 130 and then sealed with an opaque adhesive sealant. After a valley gap 317 has been terminated and sealed, boom 120 extends the base 210 away from the anchor boom 110, the superstructure is rotated for alignment with the next valley gap, and then the boom 120 brings the base 210 nearer the anchor boom 110 so that boom 130 and tool 137 can install and seal the next valley gap flap 318.

Figure 31:
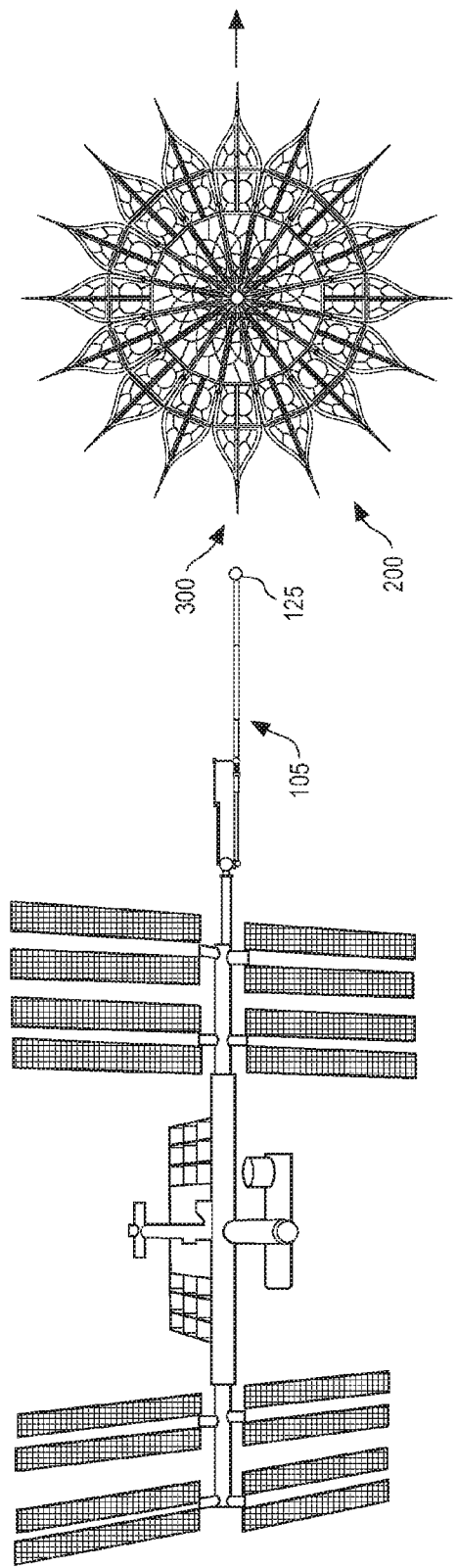
FIG. 31 illustrates the completed exemplary Starshade separating from the assembly module under its own propulsion and power.

FIG. 31 illustrates the completed 62 meter starshade example and spacecraft assembly after having un-docked from docking ring 125. The space station shown (ISS) is intended for conceptual size reference only; being in low Earth orbit there would be too large a delta V required to deliver the Starshade to its intended operational orbit around the second Sun-Earth Lagrange Point (SEL2) point. A more optimal space station location for assembly would be orbiting the second Earth-Moon Lagrange Point (EML2) point. Separation control is provided by propulsion module 205. The starshade is delivered to its final orbit destination using propulsion capability provided by propulsion module 205. Delta V required between the EML2 orbit and operational orbit around the SEL2 point is minimal.

It is relatively easy to deploy and test the above described starshade in a 1G environment due to the stage by stage assembly process. For example, the booms of the superstructure can be simply braced, supported and/or suspended during the telescoping extension of the booms without having to account for dynamic weight loads shifts or entanglements due to interconnection with the petals or fan fold covering since both of the latter are installed later. Since each of the petals are separately deployed and installed on the superstructure, the frames of the petals can be simply accessed and braced or supported as they are unfolded and opened during testing for installation on a corresponding section of the superstructure. Since the fan fold covering is installed on the superstructure only after the superstructure has been fully opened and substantially independent of the installation of the petals, the panels of the fan fold covering can be simply accessed to provide support during the deployment, positioning and installation of the fan fold covering. De-coupling of the major deployment subsystems leads to an overall lower complexity starshade.

This should be contrasted with the difficulties of testing and deployment in a 1G environment of a starshade larger than 40 meters that is stored with all of its components in an interconnected state. The unfolding and sliding movements of interconnected elements from the stored state to the fully deployed state makes providing suitable supports difficult during the assembly due to changing physical orientations, entanglement prevention, access restrictions and balancing/load issues. As the elements unfold and slide during the assembly, entanglement concerns between all of the interconnected components must be constantly addressed and a highly dynamic support mechanism would be required in order to provide adequate support due to the corresponding dynamic changes of weight distribution and balancing requirements without undesirable loading or snag conditions occurring.

Starshade sizes larger than the example 62 meters may be obtained using additional launches to provide increased petal and fan fold covering area, and the step by step deploy and assemble in space process described. The telescoping booms 220, and struts 230 and 235 of the tensegrity superstructure 215 can be increased in deployed length using increased number of concentric telescoping stages and a longer STEM drive tape.

Although exemplary implementations of the invention have been depicted and described in detail herein, it will be apparent to those skilled in the art that various modifications, additions, substitutions, and the like can be made without departing from the spirit of the invention. For example, if appropriate robotic arm(s) are available as part of a space station, then another robotic arm structure 105 need not be provided, thereby leaving only two payloads to be delivered into space in order to construct the starshade. Depending on the payload size and capability of a space transport, the payloads could be simultaneously carried into space. Alternatively, the different components of the starshade as described above could be packaged and/or combined into different payloads. Further still, it is also possible to use the assembly module 105 as the space based tele-robotic assembly station by itself if it can be appropriately sized for power, communications, data handling and control systems capabilities; tele-robotic operation would all have to be performed by ground operators (or autonomously) with this modification (and no spacewalk backup possible).

The scope of the invention is defined in the following claims.

The invention claimed is:

1. A starshade for deployment and assembly in space and adapted for development and testing in a 1G environment comprising:
   a tensegrity truss structure having:
      a central hub;
      telescoping booms mounted to the central hub and disposed radially outward to lie in a substantially flat symmetrical conical frustum in a final deployed position; and
      telescoping tension struts connected to the central hub and booms to provide a compressive force on the booms towards the central hub when the booms are fully extended in final deployment;
   a plurality of opaque petals not supported by the tensegrity truss structure when the booms of the tensegrity truss structure are initially fully extended in deployment, each petal being sequentially deployed and placed on and attached to the tensegrity truss structure in side by side position to form a concentric ring of petals spaced apart from the central hub;
   a fan fold covering not supported by the tensegrity truss structure when the booms of the tensegrity truss structure are initially fully extended in deployment, the fan fold covering being placed on and attached to the tensegrity truss structure to form an opaque, concentric inner ring about the central hub, an outer edge of the inner ring being adjacent an interior edge of the concentric ring of petals to block light from the petals to the central hub.

2. The starshade according to claim 1 further comprising:
   a first robotic arm, adapted to install and attach the petals and fan fold covering on the tensegrity truss structure, that is not part of a final starshade assembly.

3. The starshade according to claim 1 further comprising:
   first and second payloads of first and second rockets, respectively;
   the tensegrity truss structure being the first payload and the plurality of opaque petals and the fan fold covering being the second payload, the first and second rockets adapted to launch the respective first and second payload into space.

4. The starshade according to claim 2 further comprising:
   first, second, and third payloads of first, second and third rockets, respectively;
   the first robotic arm being the first payload, the tensegrity truss structure being the second payload, and the plurality of opaque petals and the fan fold covering being the third payload, the first, second and third rockets adapted to launch the respective first, second and third payloads into space.

5. The starshade according to claim 2 wherein the first robotic arm includes a first tool for holding the petals and fan fold covering as the one robotic arm positions the petals and fan fold covering for attachment on the tensegrity truss structure.

6. The starshade according to claim 5 wherein the first robotic arm includes a second tool for filling seams associated with petals and fan fold covering with opaque material to prevent light leakage via the seams.

7. The starshade according to claim 2 further comprising:
   an anchor boom to which the first robotic arm is attached;
   a second robotic arm attached to the anchor boom at a location spaced apart from the attachment of the first robotic arm.

8. The starshade according to claim 7 wherein the second robotic arm includes another tool which couples to the tensegrity truss structure and controls the position of the tensegrity truss structure relative to the anchor boom.

9. A method for assembling a starshade comprising the steps of:
   deploying a tensegrity truss structure from a stored position to a final operational position, the tensegrity truss structure having booms each with an end mounted to a central hub, the booms being parallel to each other in the stored position;
   pivoting the booms radially outward and telescoping each boom in length to lie substantially in a substantially flat symmetrical conical frustum in the final operational position;
   exerting a compressive force on the booms towards the central hub when the booms are in the final operational position by tension struts connected to the central hub and booms;
   storing a plurality of opaque petals not supported by the tensegrity truss structure while the latter is in its stored position;
   sequentially placing and attaching each petal on the tensegrity truss structure in side by side position to form a concentric ring of petals spaced apart from the central hub while the tensegrity truss structure is in its final operational position;
   storing a fan fold covering not supported by the tensegrity truss structure while the latter is in its stored position;
   placing and attaching the fan fold covering to the tensegrity truss structure to form an opaque, concentric inner ring about the central hub while the tensegrity truss structure is in its final operational position, an outer edge of the inner ring being adjacent and overlapping an interior edge of the concentric ring of petals to block light from the petals to the central hub.

10. The method according to claim 9 further comprising:
    using a first robotic arm to install and attach the petals and fan fold covering on the tensegrity truss structure.

11. The method according to claim 9 further comprising:
    storing the tensegrity truss structure as a first payload and the plurality of opaque petals and the fan fold covering as a second payload of first and second rockets, respectively, the first and second rockets adapted to launch the respective first and second payloads into space.

12. The method according to claim 10 further comprising:
    storing the first robotic arm as a first payload, storing the tensegrity truss structure as the second payload, and storing the plurality of opaque petals and the fan fold covering as a third payload, the first, second, and third payloads carried respectively by first, second and third rockets adapted to launch the first, second and third payloads into space.

13. The method according to claim 10 wherein the first robotic arm includes a first tool that holds the petals and fan fold covering as the one robotic arm positions the petals and fan fold covering for attachment on the tensegrity truss structure.

14. The method according to claim 13 wherein the first robotic arm includes a second tool that installs fasteners to hold the petals to the tensegrity truss structure.

15. The method according to claim 14 wherein the first robotic arms includes a third tool that fills seams associated with petals and fan fold covering with an opaque material to prevent light leakage via the seams.

16. The method according to claim 10 further comprising:
   deploying an anchor boom configured to dock with a space station, the first robotic arm being attached to the anchor boom;
   using a second robotic arm attached to the anchor boom at a location spaced apart from the attachment of the first robotic arm;
   coupling another tool attached to the second robotic arm with the tensegrity truss structure and controlling the position of the tensegrity truss structure relative to the anchor boom by the second robotic arm.

17. The method according to claim 9 wherein all steps are performed in space.

18. The method according to claim 9 wherein all steps are performed in 1G gravity to test the assembly of the starshade.

* * * * *